United States Patent
Jiao et al.

(10) Patent No.: US 12,192,803 B2
(45) Date of Patent: Jan. 7, 2025

(54) CHANNEL MEASUREMENT METHOD AND TERMINAL APPARATUS

(71) Applicant: Huawei Technologies Co., Ltd., Shenzhen (CN)

(72) Inventors: Chunxu Jiao, Shanghai (CN); Pu Yuan, Shenzhen (CN); Jinfang Zhang, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 388 days.

(21) Appl. No.: 17/672,043

(22) Filed: Feb. 15, 2022

(65) Prior Publication Data

US 2022/0174517 A1 Jun. 2, 2022

Related U.S. Application Data

(63) Continuation of application No. PCT/CN2020/108692, filed on Aug. 12, 2020.

(30) Foreign Application Priority Data

Aug. 16, 2019 (CN) .......................... 201910760543.6

(51) Int. Cl.
*H04W 24/06* (2009.01)
*H04B 7/06* (2006.01)
(Continued)

(52) U.S. Cl.
CPC .......... *H04W 24/06* (2013.01); *H04B 7/0626* (2013.01); *H04L 1/0026* (2013.01);
(Continued)

(58) Field of Classification Search
None
See application file for complete search history.

(56) References Cited

U.S. PATENT DOCUMENTS 9,565,010 B2   2/2017  Wan et al.
2013/0242778 A1  9/2013  Geirhofer et al.
(Continued)

FOREIGN PATENT DOCUMENTS

CN   102821393 A   12/2012
CN   107925495 A   4/2018
(Continued)

OTHER PUBLICATIONS

3GPP TS 38.214 V15.6.0 (Jun. 2019), "3rd Generation Partnership Project; Technical Specification Group Radio Access Network; NR; Physical layer procedures for data(Release 15)," 105 pages.
(Continued)

*Primary Examiner* — Hassan A Phillips
*Assistant Examiner* — Gautam Sharma
(74) *Attorney, Agent, or Firm* — Slater Matsil, LLP

(57) ABSTRACT

This application provides a channel measurement method and an apparatus, which may be used in a field such as vehicle-to-everything V2X, smart internet of vehicles, autonomous driving, or an unmanned driving. In a sidelink channel report procedure, a transmit end apparatus for sidelink communication indicates one or more candidate time intervals to a receive end apparatus. The receive end apparatus may attempt to obtain an available PSSCH for sending a channel measurement report on one or more time domain resources corresponding to the one or more candidate time intervals.

20 Claims, 7 Drawing Sheets

(51) Int. Cl.
*H04L 1/00* (2006.01)
*H04W 24/10* (2009.01)
*H04W 72/20* (2023.01)
*H04L 5/00* (2006.01)
*H04W 4/40* (2018.01)

(52) U.S. Cl.
CPC .......... *H04W 24/10* (2013.01); *H04W 72/20* (2023.01); *H04L 5/0051* (2013.01); *H04W 4/40* (2018.02)

(56) References Cited

U.S. PATENT DOCUMENTS

| | | | | |
|---|---|---|---|---|
| 2013/0301467 | A1* | 11/2013 | Kang | H04L 5/0048 370/252 |
| 2015/0230259 | A1* | 8/2015 | Park | H04B 7/086 370/329 |
| 2016/0212643 | A1* | 7/2016 | Park | H04B 7/0478 |
| 2017/0063503 | A1* | 3/2017 | Liu | H04L 5/0048 |
| 2017/0078964 | A1* | 3/2017 | Siomina | H04W 76/28 |
| 2018/0167989 | A1 | 6/2018 | Yasukawa et al. | |
| 2019/0174482 | A1 | 6/2019 | Mok et al. | |
| 2022/0015067 | A1* | 1/2022 | Li | H04L 5/0055 |
| 2024/0121717 | A1* | 4/2024 | Su | H04W 52/028 |

FOREIGN PATENT DOCUMENTS

| | | |
|---|---|---|
| CN | 108633003 A | 10/2018 |
| CN | 109644455 A | 4/2019 |
| CN | 110049563 A | 7/2019 |
| CN | 110086582 A | 8/2019 |
| EP | 3890246 A1 | 10/2021 |
| WO | 2019065189 A1 | 4/2019 |

OTHER PUBLICATIONS

3GPP TS 38.321 V15.6.0 (Jun. 2019), "3rd Generation Partnership Project; Technical Specification Group Radio Access Network; NR; Medium Access Control (MAC) protocol specification(Release 15)," 78 pages.

3GPP TS 38.331 V15.6.0 (Jun. 2019), "3rd Generation Partnership Project; Technical Specification Group Radio Access Network; NR; Radio Resource Control (RRC) protocol specification (Release 15)," 519 pages.

Catt, "Discussion on resource allocation mechanism in NR V2X," 3GPP TSG RAN1 Meeting #95, Spokane, USA, Nov. 12-16, 2018, R1-1812620, 9 pages.

Vivo, "Physical layer procedure for NR sidelink," 3GPP TSG RAN WG1 Meeting #97, Reno, USA, May 13-17, 2019, R1-1906142, 12 pages.

Oppo, "Physical layer structure for NR-V2X. 3GPP TSG RAN WG1 #97," Reno, USA, May 13-17, 2019, R1-1906472, 12 pages.

Huawei et al., "Sidelink CSI," 3GPP TSG RAN WG1 Meeting #97, Reno, USA, May 13-17, 2019, R1-1906595, 4 pages.

Interdigital, Inc., "On Physical Layer Procedures for NR V2X Sidelink," 3GPP TSG RAN WG1 #97, Reno, USA, May 13-17, 2019, R1-1907096, 8 pages.

Huawei et al., 3GPP TSG RAN WGI Meeting #96bis, Xi'an, China, Apr. 8-12, 2019, R1-1904688, 6 pages.

* cited by examiner

CHANNEL MEASUREMENT METHOD AND TERMINAL APPARATUS

CROSS-REFERENCE TO RELATED APPLICATIONS

This application is a continuation of International Application No. PCT/CN2020/108692, filed on Aug. 12, 2020, which claims priority to Chinese Patent Application No. 201910760543.6, filed on Aug. 16, 2019. The disclosures of the aforementioned applications are hereby incorporated by reference in their entireties.

TECHNICAL FIELD

This application relates to the field of vehicle-to-everything, and more specifically, to a sidelink channel measurement method and a terminal apparatus.

BACKGROUND

In evolution of communication systems, a requirement of each generation of communication system for channel state information (CSI) has not changed. At a signal sending end, channel state information (CSI) is used to calculate an appropriate sending parameter to optimize radio channel use efficiency. At a signal receiving end, the CSI is used to correctly receive a signal. In a new radio (NR) system, a channel measurement procedure is improved. A downlink and an uplink are respectively implemented by using a channel state information reference signal (CSI-RS) framework and a sounding reference signal (SRS) framework. However, channel measurement procedures in the two frameworks are designed specifically for an air interface between a base station and user equipment (UE). In a vehicle-to-everything (V2X) scenario, because both communication parties are terminal devices, there are many features different from those of communication between a base station and a terminal device in NR. For example, in a cellular link, various channel resources may be scheduled by the base station. This ensures that the channel resources scheduled by the base station can be used by the terminal device. In an SL, both communication parties are terminal devices, serving base stations of the communication parties may be different, and whether the communication parties are covered by the base stations is not limited.

Currently, there is no specific solution for implementing channel measurement in a sidelink (SL) scenario such as V2X.

SUMMARY

This application provides a channel measurement method and an apparatus, to implement sidelink channel measurement, optimize sidelink channel use efficiency, and improve communication quality.

According to a first aspect, this application provides a channel measurement method. The method includes: A first terminal apparatus sends indication information to a second terminal apparatus, where the indication information is used to indicate one or more candidate time intervals, the candidate time interval is a time interval between a time domain resource for carrying trigger information and a time domain resource for carrying a channel measurement report, and the trigger information is used to trigger channel measurement. The first terminal apparatus sends first trigger information to the second terminal apparatus. The first terminal apparatus sends a first reference signal to the second terminal apparatus, where the first reference signal is used for channel measurement. The first terminal apparatus detects a channel measurement report from the second terminal apparatus based on the one or more candidate time intervals.

In the technical solutions of this application, a transmit end apparatus (that is, the first terminal apparatus) for sidelink communication sends indication information to a receive end apparatus (that is, the second terminal apparatus). The indication information is used to indicate one or more candidate time intervals that can be used by the second terminal apparatus to send a sidelink channel measurement report, to assist the second terminal apparatus in reporting the sidelink channel measurement report, and provide a feasible solution for sidelink channel measurement.

The terminal apparatus in the embodiments of this application may be a terminal device, may be a chip applied to the terminal device, such as a baseband communication chip, or may be a combination device, a component, or the like that can implement the foregoing method functions in the terminal device.

With reference to the first aspect, in some implementations of the first aspect, that the first terminal apparatus detects a channel measurement report from the second terminal apparatus based on the one or more candidate time intervals includes: The first terminal apparatus receives a first channel measurement report from the second terminal apparatus in a first time range, where the first time range is a time range whose duration is a first candidate time interval starting from a moment for sending the first trigger information, and the first candidate time interval is a maximum candidate time interval in the one or more candidate time intervals.

When detecting the channel measurement report, the first terminal apparatus does not send the channel measurement report. This may improve a probability that the first terminal apparatus detects and successfully decodes the first channel measurement report from the second terminal apparatus, thereby ensuring smooth execution of a channel measurement procedure.

With reference to the first aspect, in some implementations of the first aspect, that the first terminal apparatus detects a channel measurement report from the second terminal apparatus based on the one or more candidate time intervals includes: The first terminal apparatus detects no channel measurement report from the second terminal apparatus in a first time range, where the first time range is a time range whose duration is a first candidate time interval starting from a moment for sending the first trigger information, and the first candidate time interval is a maximum candidate time interval in the one or more candidate time intervals. The first terminal apparatus sends second trigger information to the second terminal apparatus. The first terminal apparatus sends a second reference signal to the second terminal apparatus.

When the first terminal apparatus detects no channel measurement report in the first time range, the first terminal apparatus sends the second trigger information and the second reference signal to the second terminal apparatus, to trigger new sidelink channel measurement, thereby improving a sidelink channel measurement mechanism, and ensuring smooth execution of channel measurement.

With reference to the first aspect, in some implementations of the first aspect, the method further includes: The first terminal apparatus sends configuration information to the second terminal apparatus, where the configuration information is used to indicate a candidate time interval set, and the one or more candidate time intervals belong to the candidate time interval set.

After configuring the candidate time interval set used for channel measurement reporting, the first terminal apparatus indicates the one or more candidate time intervals in the candidate time interval set by using the indication information. Flexibility of channel report configuration can be improved.

In addition, the second terminal apparatus does not need to attempt to obtain a PSSCH at each candidate time interval included in the candidate time interval set, but only attempts to obtain an available PSSCH at the one or more candidate time intervals indicated by the indication information, to send the channel measurement report, thereby reducing power consumption of the second terminal apparatus.

With reference to the first aspect, in some implementations of the first aspect, the method further includes: The first terminal apparatus sends a negative acknowledgement to the second terminal apparatus, where the negative acknowledgement is used to indicate that the first terminal apparatus fails to decode a first physical sidelink shared channel PSSCH, and the first PSSCH carries data and the first channel measurement report. The first terminal apparatus receives a second PSSCH from the second terminal apparatus, where the second PSSCH carries the data and the first channel measurement report. The first terminal apparatus receives first retransmission indication information from the second terminal apparatus, where the first retransmission indication information is used to indicate whether the second PSSCH is later than third trigger information, and the third trigger information is trigger information that is last sent by the first terminal apparatus to the second terminal apparatus after the first trigger information.

In this application, if the second terminal apparatus retransmits a PSSCH, and the retransmitted PSSCH carries a channel measurement report, the second terminal apparatus additionally sends the first retransmission indication information to the first terminal apparatus, so that the first terminal apparatus can determine, based on the first retransmission indication information, whether the received channel measurement report expires, to further determine whether to update a sidelink channel measurement result based on the channel measurement report, thereby improving performance of a sidelink channel report retransmission mechanism.

With reference to the first aspect, in some implementations of the first aspect, the first retransmission indication information is used to indicate that the second PSSCH is later than the third trigger information, and the method further includes: The first terminal apparatus discards the first channel measurement report.

After new channel report is triggered, the second terminal apparatus does not retransmit the PSSCH that includes only the channel measurement report. This avoids unnecessary retransmission, thereby avoiding a resource waste caused by unnecessary retransmission, and optimizing a sidelink channel report retransmission mechanism.

With reference to the first aspect, in some implementations of the first aspect, that the first terminal apparatus detects a channel measurement report from the second terminal apparatus based on the one or more candidate time intervals includes: The first terminal apparatus detects the channel measurement report on one or more time domain resources corresponding to the one or more candidate time intervals.

The first terminal apparatus configures one candidate time interval set for the second terminal apparatus. After obtaining the channel measurement report by measuring a CSI-RS, the second terminal apparatus attempts to obtain an available PSSCH at each candidate time interval in the candidate time interval set, to improve a probability of successfully obtaining the PSSCH, thereby ensuring smooth execution of a channel measurement procedure.

According to a second aspect, this application provides a channel measurement method. The method includes: A second terminal apparatus receives indication information from a first terminal apparatus, where the indication information is used to indicate one or more candidate time intervals, the candidate time interval is a time interval between a time domain resource for carrying trigger information and a time domain resource for carrying a channel measurement report, and the trigger information is used to trigger channel measurement. The second terminal apparatus receives first trigger information from the first terminal apparatus. The second terminal apparatus receives a first reference signal from the first terminal apparatus, and obtains a first channel measurement report based on the first reference signal. The second terminal apparatus determines a first time domain resource based on the indication information, where the first time domain resource is used to send the first channel measurement report to the first terminal apparatus.

It should be understood that the channel measurement method in the second aspect and the channel measurement method in the first aspect are based on a same inventive concept. Therefore, for beneficial technical effects that can be achieved by the technical solutions in the second aspect, refer to descriptions of corresponding solutions in the first aspect. Details are not described again.

With reference to the second aspect, in some implementations of the second aspect, the first time domain resource and a second time domain resource for carrying the first trigger information meet a first time interval, and the first time interval is a time interval in the one or more candidate time intervals.

With reference to the second aspect, in some implementations of the second aspect, the method further includes: The second terminal apparatus receives configuration information from the first terminal apparatus, where the configuration information is used to indicate a candidate time interval set, and the one or more candidate time intervals belong to the candidate time interval set.

With reference to the second aspect, in some implementations of the second aspect, the method further includes: The second terminal apparatus receives a negative acknowledgement from the first terminal apparatus, where the negative acknowledgement is used to indicate that the first terminal apparatus fails to decode a first PSSCH, and the first PSSCH carries data and the first channel measurement report. The second terminal apparatus sends a second PSSCH to the first terminal apparatus, where the second PSSCH carries the data and the first channel measurement report. The second terminal apparatus sends first retransmission indication information to the first terminal apparatus, where the first retransmission indication information is used to indicate whether the second PSSCH is later than third trigger information, and the third trigger information is trigger information that is last sent by the first terminal apparatus to the second terminal apparatus after the first trigger information.

With reference to the second aspect, in some implementations of the second aspect, the method further includes:

The second terminal apparatus receives a negative acknowledgement from the first terminal apparatus, where the negative acknowledgement is used to indicate that the first terminal apparatus fails to decode a first PSSCH, and the first PSSCH carries only the first channel measurement report. If the second terminal apparatus receives third trigger information from the first terminal apparatus, the second terminal apparatus skips retransmitting the first PSSCH, where the third trigger information is trigger information that is last sent by the first terminal apparatus to the second terminal apparatus after the first trigger information.

In some implementations of the first aspect or the second aspect, a time domain resource for carrying the first trigger information is the same as a time domain resource for carrying the first reference signal.

The first terminal apparatus sends the first trigger information and the first reference signal by using the same time domain resource. This can reduce a time interval from a moment for sending the first trigger information to a moment for successfully decoding the first channel measurement report, and can accelerate a channel measurement procedure.

In some implementations of the first aspect or the second aspect, a time domain resource for carrying the second PSSCH is the same as a time domain resource for carrying the first retransmission indication information.

The first terminal apparatus uses the same time domain resource for the first retransmission indication information and the second PSSCH. This can reduce a time interval from a moment for receiving the negative acknowledgement to a moment for sending the second PSSCH by the second terminal apparatus, and can accelerate a channel measurement report retransmission procedure.

According to a third aspect, this application provides a data retransmission method. The method includes: A second terminal apparatus receives a negative acknowledgement from a first terminal apparatus, where the negative acknowledgement is used to indicate that the first terminal apparatus fails to decode a first PSSCH, the first PSSCH carries a sidelink first channel measurement report, the first channel measurement report is fed back for first trigger information, and the first trigger information is used to trigger channel measurement. The second terminal apparatus determines, based on whether third trigger information is received from the first terminal apparatus, a policy for retransmitting the first PSSCH to the first terminal apparatus, where the third trigger information is trigger information that is used to trigger channel measurement and that is last sent by the first terminal apparatus to the second terminal apparatus after the first trigger information.

In this application, the second terminal apparatus sends first retransmission indication information to the first terminal apparatus based on whether new trigger information used to trigger channel measurement is received before a PSSCH is retransmitted, to indicate whether a channel measurement report carried on the retransmitted PSSCH expires, so that the first terminal apparatus can determine, based on the first retransmission indication information, whether the received channel measurement report expires, to further select whether to update a sidelink channel measurement result based on the channel measurement report, thereby improving performance of a sidelink channel report retransmission mechanism.

With reference to the third aspect, in some implementations of the third aspect, the first PSSCH carries only the first channel measurement report, and that the second terminal apparatus determines, based on whether third trigger information is received from the first terminal apparatus, a policy for retransmitting the first PSSCH to the first terminal apparatus includes: If the second terminal apparatus does not receive the third trigger information from the first terminal apparatus, the second terminal apparatus sends a second PSSCH to the first terminal apparatus, where the second PSSCH carries the first channel measurement report. The second terminal apparatus sends first retransmission indication information to the first terminal apparatus, where the first retransmission indication information is used to indicate that the second PSSCH is not later than the third trigger information.

The second terminal apparatus sends the first retransmission indication information to the first terminal apparatus based on whether new trigger information used to trigger channel measurement is received before a PSSCH is retransmitted, to indicate whether a channel measurement report carried on the retransmitted PSSCH expires. If the second terminal apparatus does not receive the new trigger information before the PSSCH is retransmitted, the second terminal apparatus indicates, by using the first retransmission indication information, that the second PSSCH is not later than the new trigger information. In other words, the channel measurement report carried on the second PSSCH does not expire. Therefore, the first terminal apparatus may select, based on the first retransmission indication information, to update a channel measurement result by using the first channel measurement report carried on the second PSSCH, to optimize performance of a sidelink channel report retransmission mechanism.

With reference to the third aspect, in some implementations of the third aspect, the first PSSCH carries data and the first channel measurement report, and that the second terminal apparatus determines, based on whether third trigger information is received from the first terminal apparatus, a policy for retransmitting the first PSSCH to the first terminal apparatus includes: If the second terminal apparatus does not receive the third trigger information from the first terminal apparatus, the second terminal apparatus sends a second PSSCH to the first terminal apparatus, where the second PSSCH carries the data and the first channel measurement report. The second terminal apparatus sends first retransmission indication information to the first terminal apparatus, where the first retransmission indication information is used to indicate that the second PSSCH is not later than the third trigger information.

The second terminal apparatus sends the first retransmission indication information to the first terminal apparatus based on whether new trigger information used to trigger channel measurement is received before a PSSCH is retransmitted, to indicate whether a channel measurement report carried on the retransmitted PSSCH expires. If the second terminal apparatus does not receive the new trigger information before the PSSCH is retransmitted, the second terminal apparatus indicates, by using the first retransmission indication information, that the second PSSCH is not later than the new trigger information. In other words, the channel measurement report carried on the second PSSCH does not expire. Therefore, the first terminal apparatus may select, based on the first retransmission indication information, to update a channel measurement result by using the first channel measurement report carried on the second PSSCH, to optimize performance of a sidelink channel report retransmission mechanism.

With reference to the third aspect, in some implementations of the third aspect, the first PSSCH carries only the first channel measurement report, and that the second terminal apparatus determines, based on whether third trigger information is received from the first terminal apparatus, a policy for retransmitting the first PSSCH to the first terminal apparatus includes: If the second terminal apparatus receives the third trigger information from the first terminal apparatus, the second terminal apparatus does not retransmit the first PSSCH.

If the second terminal apparatus receives, before a PSSCH is retransmitted, new trigger information used to trigger channel measurement, and the retransmitted PSSCH includes a channel measurement report, the second terminal apparatus does not retransmit the PSSCH. It should be understood that new channel measurement has been triggered before the PSSCH is retransmitted. If the second terminal apparatus continues to retransmit the first channel measurement report to the first terminal apparatus, the first channel measurement report expires, and consequently unnecessary retransmission is caused. Therefore, if the second terminal apparatus receives new trigger information before the retransmission, retransmission of only the channel measurement report is canceled, to avoid a resource waste caused by unnecessary retransmission.

With reference to the third aspect, in some implementations of the third aspect, the first PSSCH carries data and the first channel measurement report, and that the second terminal apparatus determines, based on whether third trigger information is received from the first terminal apparatus, a policy for retransmitting the first PSSCH to the first terminal apparatus includes: If the second terminal apparatus receives the third trigger information from the first terminal apparatus, the second terminal apparatus sends a second PSSCH to the first terminal apparatus, where the second PSSCH carries the data and the first channel measurement report. The second terminal apparatus sends first retransmission indication information to the first terminal apparatus, where the first retransmission indication information is used to indicate that the second PSSCH is later than the third trigger information.

If the second terminal apparatus receives, before a PSSCH is retransmitted, new trigger information used to trigger channel measurement, and the retransmitted PSSCH carries other data in addition to a channel measurement report, the second terminal apparatus retransmits the PSSCH to the first terminal apparatus, that is, sends the second PSSCH. In addition, the second terminal apparatus sends the first retransmission indication information to the first terminal apparatus, to indicate that the first channel measurement report carried on the second PSSCH expires. The first terminal apparatus obtains the data only from the second PSSCH according to an indication of the first retransmission indication information, and discards the first channel measurement report, so that the first terminal apparatus can perform different retransmission processing on the data and the channel measurement report, thereby optimizing a channel report mechanism.

According to a fourth aspect, this application provides a data retransmission method. The method includes: A first terminal apparatus sends a negative acknowledgement to a second terminal apparatus, where the negative acknowledgement is used to indicate that the first terminal apparatus fails to decode a first PSSCH, the first PSSCH carries a sidelink first channel measurement report, the first channel measurement report is fed back for first trigger information, and the first trigger information is used to trigger channel measurement.

The first terminal apparatus receives a second PSSCH from the second terminal apparatus, where the second PSSCH carries the first channel measurement report.

The first terminal apparatus receives first retransmission indication information from the second terminal apparatus, where the first retransmission indication information is used to indicate whether the second PSSCH is later than third trigger information, and the third trigger information is trigger information that is used to trigger channel measurement and that is last sent by the first terminal apparatus to the second terminal apparatus after the first trigger information.

It should be understood that the sidelink data retransmission method in the fourth aspect and the sidelink data retransmission method in the third aspect are based on a same inventive concept. Therefore, for beneficial technical effects that can be achieved by the technical solutions in the fourth aspect, refer to descriptions of corresponding solutions in the third aspect. Details are not described again.

With reference to the fourth aspect, in some implementations of the fourth aspect, the first PSSCH carries only the first channel measurement report, the second PSSCH carries the first channel measurement report, and the first retransmission indication information is used to indicate that the second PSSCH is not later than the third trigger information.

The method further includes:

The first terminal apparatus updates a sidelink channel measurement result based on the first retransmission indication information by using the first channel measurement report.

With reference to the fourth aspect, in some implementations of the fourth aspect, the first PSSCH carries data and the first channel measurement report, the second PSSCH carries the data and the first channel measurement report, and the first retransmission indication information is used to indicate that the second PSSCH is not later than the third trigger information.

The method further includes:

The first terminal apparatus updates a sidelink channel measurement result based on the first retransmission indication information by using the first channel measurement report.

With reference to the fourth aspect, in some implementations of the fourth aspect, the first PSSCH carries data and the first channel measurement report, the second PSSCH carries the data and the first channel measurement report, and the first retransmission indication information is used to indicate that the second PSSCH is later than the third trigger information.

The first terminal apparatus discards the first channel measurement report based on the first retransmission indication information.

According to a fifth aspect, this application provides a terminal apparatus. The terminal apparatus has a function of implementing the method according to any one of the first aspect or the possible implementations of the first aspect, and/or the terminal apparatus has a function of implementing the method according to any one of the third aspect or the possible implementations of the third aspect. The function may be implemented by hardware, or may be implemented by hardware by executing corresponding software. The hardware or the software includes one or more units corresponding to the function.

According to a sixth aspect, this application provides a terminal apparatus. The terminal apparatus has a function of implementing the method according to any one of the second aspect or the possible implementations of the second aspect, and/or the terminal apparatus has a function of implementing the method according to any one of the fourth aspect or the possible implementations of the fourth aspect. The function may be implemented by hardware, or may be implemented by hardware by executing corresponding software. The hardware or the software includes one or more units corresponding to the function.

According to a seventh aspect, this application provides a terminal device. The terminal device includes a processor, a memory, and a transceiver. The memory is configured to store a computer program. The processor is configured to: invoke and run the computer program stored in the memory, and control the transceiver to send and receive a signal, so that the terminal device performs the method according to any one of the first aspect or the possible implementations of the first aspect, and/or performs the method according to any one of the third aspect or the possible implementations of the third aspect.

According to an eighth aspect, this application provides a terminal device. The terminal device includes a processor, a memory, and a transceiver. The memory is configured to store a computer program. The processor is configured to: invoke and run the computer program stored in the memory, and control the transceiver to send and receive a signal, so that the terminal device performs the method according to any one of the second aspect or the possible implementations of the second aspect, and/or performs the method according to any one of the fourth aspect or the possible implementations of the fourth aspect.

According to a ninth aspect, this application provides a computer-readable storage medium. The computer-readable storage medium stores computer instructions; and when the computer instructions are run on a computer, the computer is enabled to perform the method according to any one of the first aspect or the possible implementations of the first aspect, or perform the method according to any one of the third aspect or the possible implementations of the third aspect.

According to a tenth aspect, this application provides a computer-readable storage medium. The computer-readable storage medium stores computer instructions; and when the computer instructions are run on a computer, the computer is enabled to perform the method according to any one of the second aspect or the possible implementations of the second aspect, or perform the method according to any one of the fourth aspect or the possible implementations of the fourth aspect.

According to an eleventh aspect, this application provides a computer program product. The computer program product includes computer program code; and when the computer program code is run on a computer, the computer is enabled to perform the method according to any one of the first aspect or the possible implementations of the first aspect, or perform the method according to any one of the third aspect or the possible implementations of the third aspect.

According to a twelfth aspect, this application provides a computer program product. The computer program product includes computer program code; and when the computer program code is run on a computer, the computer is enabled to perform the method according to the second aspect or any possible implementation of the second aspect, or perform the method according to the fourth aspect or any possible implementation of the fourth aspect.

According to a thirteenth aspect, this application provides a communication apparatus. The communication apparatus includes a processor. The processor is configured to read and execute a computer program stored in a memory, to perform the method according to any one of the first aspect or the possible implementations of the first aspect, or perform the method according to any one of the third aspect or the possible implementations of the third aspect. For example, the communication apparatus may be a chip or a chip system.

Optionally, the chip further includes the memory, and the processor is connected to the memory through a circuit or a wire. The memory may be configured to store computer program instructions and data that are necessary for implementing functions in the method according to the first aspect and/or the third aspect.

Further, optionally, the chip further includes a communication interface.

According to a fourteenth aspect, this application provides a chip, including a processor. The processor is configured to read and execute a computer program stored in a memory, to perform the method according to any one of the second aspect or the possible implementations of the second aspect, or perform the method according to any one of the fourth aspect or the possible implementations of the fourth aspect. For example, the communication apparatus may be a chip or a chip system.

Optionally, the chip further includes the memory, and the processor is connected to the memory through a circuit or a wire. The memory may be configured to store computer program instructions and data that are necessary for implementing functions in the method according to the second aspect and/or the fourth aspect.

Further, optionally, the chip further includes a communication interface.

The chip system in the foregoing aspects may be a system on chip (system on chip, SOC), a baseband chip, or the like. The baseband chip may include a processor, a channel encoder, a digital signal processor, a modem, an interface module, or the like.

According to a fifteenth aspect, this application provides a communication system, including the terminal device in the sixth aspect and the terminal device in the seventh aspect.

DETAILED DESCRIPTION OF ILLUSTRATIVE EMBODIMENTS

The following describes the technical solutions of this application with reference to the accompanying drawings.

The technical solutions of this application may be applied to a field such as vehicle-to-everything (V2X), smart internet of vehicles, automatic driving, or assisted driving.

Figure 1:
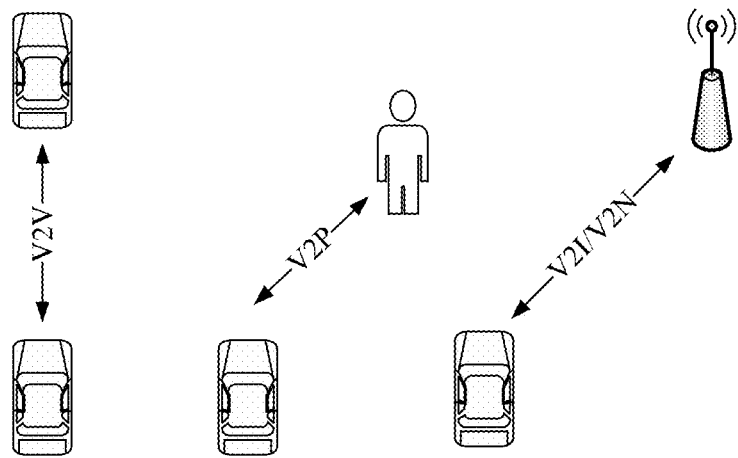
FIG. 1 is a schematic diagram of a V2X communication scenario.

FIG. 1 is a schematic diagram of a V2X communication scenario. In V2X communication, a link between vehicle-user equipment (V-UE) and vehicle-user equipment, between pedestrian-user equipment and vehicle-user equipment, or between roadside unit (RSU) devices is referred to as a sidelink (SL). A link between vehicle-user equipment and a network device is referred to as a downlink (DL) or an uplink (UL), and an air interface of the link is also referred to as a Uu air interface. Correspondingly, DL communication and UL communication are also referred to as Uu communication.

It should be understood that both parties of SL communication are terminal devices.

The terminal device mentioned in this application includes a device that provides a user with voice and/or data connectivity, for example, may include a handheld device having a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) terminal device, a V2X terminal device, a machine-to-machine/machine-type communication (M2M/MTC) terminal device, an internet of things (IoT) terminal device, a subscriber unit, a subscriber station (subscriber station), a mobile station, a remote station, an access point (AP), a remote terminal, an access terminal, a user terminal, a user agent, a user device, and the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communication service (PCS) phone, a cordless phone, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a bar code reader, a radio frequency identification (RFID) device, a sensor, a global positioning system (GPS), and or a laser scanner. In addition, all the terminal devices described above may be considered as vehicle-mounted terminal devices if they are located in a vehicle (for example, they are placed in or installed in a vehicle). The vehicle-mounted terminal device may also be referred to as an on-board unit (OBU). The terminal device in this application may alternatively be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement the method in this application.

The following describes the technical solutions of this application in detail.

In addition, the following ordinal numbers "first" and "second" are merely used to distinguish between different description objects, for example, distinguish between different terminal apparatuses or different pieces of information, but are not used to indicate a time or priority sequence.

This application provides a plurality of implementations for sidelink channel measurement.

For convenience of description, in the following, a transmit end device of data in SL communication is referred to as a first terminal apparatus, and a receive end device of data in SL communication is referred to as a second terminal apparatus.

Optionally, the first terminal apparatus and the second terminal apparatus each may be a terminal device, or may be a chip installed in the terminal device, or may be a combination device, a component, or the like that can implement the following method functions in the terminal device.

Figure 2:
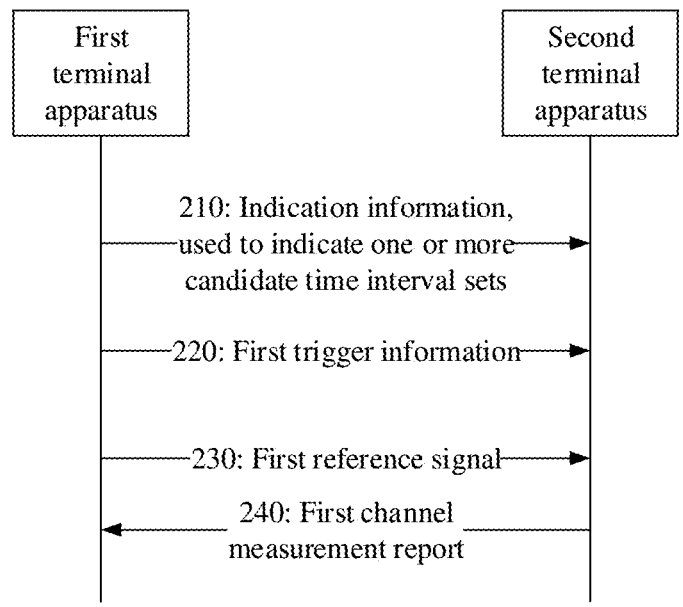
FIG. 2 is a schematic diagram of a sidelink channel measurement method according to this application.

FIG. 2 is a schematic diagram of a sidelink channel report method according to this application.

210: A first terminal apparatus sends indication information to a second terminal apparatus.

The indication information is used to indicate one or more candidate time intervals, and the candidate time interval is a time interval between a time domain resource for carrying trigger information and a time domain resource for carrying a channel measurement report. The trigger information is used to trigger sidelink channel measurement between the first terminal apparatus and the second terminal apparatus.

Optionally, the interval between the time domain resource for carrying the trigger information and the time domain resource for carrying the channel measurement report may be calculated by using a start moment of each time domain resource, or by using an end moment of each time domain resource, or in another manner. This is not limited herein.

Optionally, the candidate time interval may be in a unit of slot, a symbol, a subframe, or a frame. Correspondingly, the indication information may be used to indicate a slot offset, a symbol offset, a subframe offset, a frame offset, or the like.

In addition, when the indication information is used to indicate a plurality of candidate time intervals, time domain units corresponding to the plurality of candidate time intervals may be consecutive, or may be discrete; or some of the candidate time intervals are consecutive, and the other of the candidate time intervals are discrete.

For example, if the indication information is used to indicate a plurality of candidate slot offsets, and the plurality of candidate slot offsets are {1, 2, 3, 4}, the plurality of candidate slot offsets are consecutive. For another example, if the plurality of candidate slot offsets are {1, 3, 5, 8}, the plurality of candidate slot offsets are discrete. For another example, if the plurality of candidate slot offsets are {1, 2, 3, 5, 8}, some of the plurality of candidate slot offsets are consecutive, and some of the plurality of candidate slot offsets are discrete.

220: The first terminal apparatus sends first trigger information to the second terminal apparatus.

The second terminal apparatus receives the first trigger information from the first terminal apparatus.

230: The first terminal apparatus sends a first reference signal to the second terminal apparatus. The first reference signal is used for sidelink channel measurement.

Specifically, the first reference signal may be a sidelink channel state information reference signal SL CSI-RS.

Correspondingly, the second terminal apparatus receives the first reference signal, and obtains a first channel measurement report by measuring the first reference signal.

Optionally, a sequence of step 220 and step 230 is merely used as an example. In another implementation, time domain resources used by the first terminal apparatus to send the first trigger information and the first reference signal are the same. In other words, the first trigger information and the first reference signal are simultaneously sent.

In the technical solutions of this application, the first terminal apparatus indicates the one or more candidate time intervals to the second terminal apparatus, so that the second terminal apparatus reports a sidelink channel measurement report.

The second terminal apparatus measures the first reference signal sent by the first terminal apparatus, to obtain the first channel measurement report. The second terminal apparatus obtains a PSSCH on one or more time domain resources corresponding to the one or more candidate time intervals indicated by the indication information received in step 210, to send the first channel measurement report to the first terminal apparatus.

240: The second terminal apparatus sends the first channel measurement report to the first terminal apparatus.

The first terminal apparatus detects a channel measurement report from the second terminal apparatus on the one or more time domain resources corresponding to the one or more candidate time intervals.

In this application, a maximum candidate time interval in the one or more candidate time intervals indicated by the indication information is defined as a first candidate time interval. Based on the first candidate time interval, a time range whose duration is the first candidate time interval starting from a moment for sending the first trigger information by the first terminal apparatus is referred to as a first time range.

The first terminal apparatus detects a channel measurement report in the first time range. Specifically, the first terminal apparatus detects the channel measurement report from the second terminal apparatus on the one or more time domain resources corresponding to the one or more candidate time intervals.

Alternatively, after sending the first trigger information, the first terminal apparatus detects the channel measurement report from the second terminal apparatus on the one or more time domain resources corresponding to the one or more candidate time intervals.

Alternatively, the one or more time domain resources corresponding to the one or more candidate time intervals may be represented as one or more time domain units, one or more time units, or one or more moments corresponding to the one or more candidate time intervals. The time domain unit or the time unit may be in a unit of slot (slot), a symbol, a subframe, a frame, or the like.

It should be understood that, if the first terminal apparatus does not perform sending on a time domain resource other than the one or more time domain resources corresponding to the one or more candidate time intervals in the first time range, the first terminal apparatus may also detect the channel measurement report from the second terminal apparatus on the time domain resource.

It should be understood that the first terminal apparatus sends the indication information to the second terminal apparatus, to assist the second terminal apparatus in sending the first channel measurement report. Specifically, the first terminal apparatus may assist, in a plurality of manners, the first terminal apparatus in sending the first channel measurement report. The following separately describes the manners in detail.

Manner 1

The first terminal apparatus sends the indication information to the second terminal apparatus, where the indication information is used to indicate the one or more candidate time intervals.

The second terminal apparatus attempts to obtain an available PSSCH on the time domain resource corresponding to each of the one or more candidate time intervals, and sends the channel measurement report to the first terminal apparatus by using the obtained PSSCH.

Manner 2

The first terminal apparatus sends channel report configuration information to the second terminal apparatus, where the channel report configuration information is used to indicate a candidate time interval set. Further, the first terminal apparatus sends the indication information to the second terminal apparatus, and the indication information is used to indicate the one or more candidate time intervals in the candidate time interval set.

In other words, before sending the indication information to the second terminal apparatus, the first terminal apparatus indicates the candidate time interval set to the second terminal apparatus by using the channel report configuration information. The one or more candidate time intervals indicated by the indication information belong to the candidate time interval set.

Optionally, in an implementation, the channel report configuration information is used to indicate one or more sequence numbers of the one or more time domain resources corresponding to the one or more candidate time intervals included in the candidate time interval set. Further, the indication information is used to indicate one or more of the one or more sequence numbers of the one or more time domain resources.

Alternatively, the candidate time interval set may also be referred to as a candidate time interval list. When the time interval is in a unit of slot, the candidate time interval set is also referred to as a candidate slot list or a report slot offset list (report slot offset list).

In the manner 2, the first terminal apparatus indicates the candidate time interval set to the second terminal apparatus by using the channel report configuration information. Then, the first terminal apparatus indicates the one or more candidate time intervals in the candidate time interval set by using the indication information.

The second terminal apparatus obtains the available PSSCH on the one or more time domain resources corresponding to the one or more candidate time intervals indicated by the indication information, and sends the channel measurement report to the first terminal apparatus by using the obtained PSSCH.

It should be understood that in the manner 1, the first terminal apparatus directly indicates an available candidate time interval to the second terminal apparatus, and the second terminal apparatus may attempt to obtain the available PSSCH on the time domain resource corresponding to each of the candidate time intervals indicated by the indication information. In the manner 2, the first terminal apparatus first indicates the candidate time interval set to the second terminal apparatus, and then indicates one or more available candidate time intervals in the candidate time interval set. The second terminal apparatus attempts to obtain the available PSSCH only on the time domain resource corresponding to the candidate time interval indicated by the indication information.

Optionally, in an implementation, after indicating the candidate time interval set to the second terminal apparatus, the first terminal apparatus indicates, to the second terminal apparatus in a bitmap (bitmap) manner, the one or more available candidate time intervals in the candidate time interval set.

Herein, that the time interval is a slot is used as an example for description. In this case, the candidate time interval set is a candidate slot set.

For example, the candidate slot set configured by the first terminal apparatus for the second terminal apparatus is {1, 2, 3, 4, 5, 7, 9, 11, 13, 15, 17, 19, 21, 23, 25, 27}, and the indication information sent by the first terminal apparatus to the second terminal apparatus is 1111000000000000. Herein, 1 represents an offset of an available candidate slot in the candidate slot set. Based on the candidate slot set and the indication information, the second terminal apparatus may attempt to obtain an available PSSCH on slots corresponding to slot offsets {1, 2, 3, 4}.

It should be understood that the offset of the candidate slot is an offset between a slot for carrying the first trigger information and a slot for carrying the first channel measurement report.

In another implementation, the first terminal apparatus indicates only the candidate time interval set to the second terminal apparatus, as shown in the following manner 3.
Manner 3

The first terminal apparatus sends channel report configuration information to the second terminal apparatus, where the channel report configuration information is used to indicate a candidate time interval set.

The second terminal apparatus attempts to obtain an available PSSCH on a time domain resource corresponding to each candidate time interval in the candidate time interval set. If the second terminal apparatus successfully obtains a PSSCH on a time domain resource corresponding to a candidate time interval, the second terminal apparatus sends the first channel measurement report to the first terminal apparatus by using the obtained PSSCH.

In another implementation, the first terminal apparatus sends neither the candidate time interval set nor the indication information to the second terminal apparatus, as shown in a manner 4.

Optionally, when the indication information in step 210 indicates a plurality of candidate time intervals, the plurality of candidate time intervals may be all candidate time intervals in the candidate time interval set, as shown in the manner 3. Alternatively, the plurality of candidate time intervals may be some candidate time intervals in the candidate time interval set, as shown in the manner 1.

In the manner 1 to the manner 3, after triggering channel measurement by using the trigger information, the second terminal apparatus sends the channel measurement report to the first terminal apparatus by using the obtained PSSCH in the first time range. Specifically, the second terminal apparatus attempts to obtain an available PSSCH on the one or more time domain resources corresponding to one or more candidate time intervals indicated by the first terminal apparatus, and sends the channel measurement report to the second terminal apparatus by using the obtained PSSCH.

Correspondingly, the first terminal apparatus detects the channel measurement report in the first time range. Specifically, the first terminal apparatus detects the channel measurement report from the second terminal apparatus on the one or more time domain resources corresponding to the one or more candidate time intervals. If the first terminal apparatus does not perform sending on a time domain resource other than the one or more time domain resources corresponding to the one or more candidate time intervals in the first time range, the first terminal apparatus may also detect the channel measurement report from the second terminal apparatus on the time domain resource.
Manner 4

Channel report configuration information sent by the first terminal apparatus to the second terminal apparatus does not indicate the candidate time interval set, and the first terminal apparatus does not send the indication information to the second terminal apparatus.

After obtaining the first channel measurement report by measuring the first reference signal, the second terminal apparatus independently attempts to obtain an available PSSCH for sidelink channel report. If the second terminal apparatus successfully obtains the PSSCH, the second terminal apparatus sends the first channel measurement report by using the obtained PSSCH. In other words, in the manner 4, the second terminal apparatus performs channel report in a "best-effort" manner.

A sidelink channel report configuration provided in this application is described above. The following describes a sidelink channel measurement procedure in detail.

Figure 3:
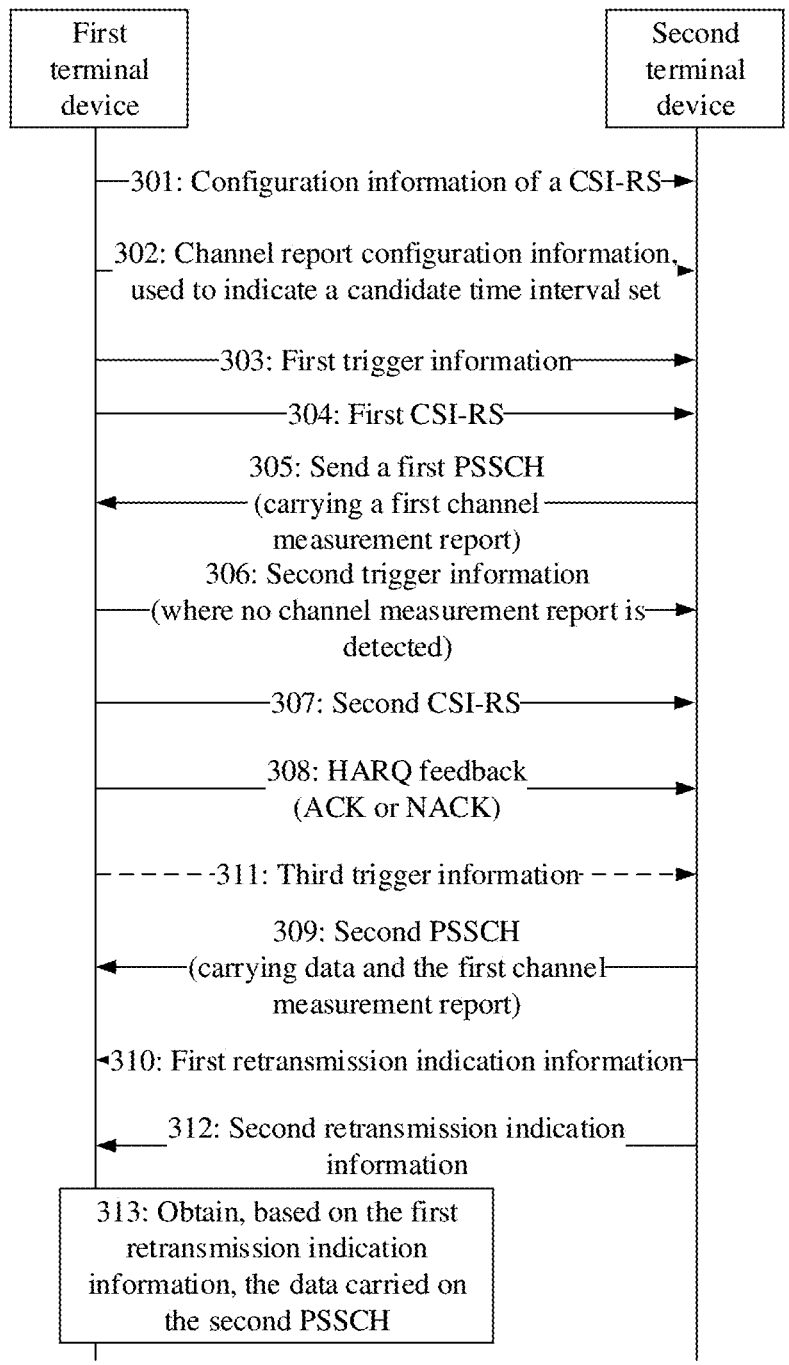
FIG. 3 is a schematic diagram of a channel measurement procedure according to this application.

With reference to FIG. 3, the following describes a sidelink channel measurement and channel report procedure provided in this application.

The manner 3 is used as an example of channel report in FIG. 3. In the procedure shown in FIG. 3, channel report may be further performed in another manner described above.

FIG. 3 is an example of a channel measurement and channel report procedure according to this application.

301: A first terminal apparatus sends configuration information of an SL CSI-RS to a second terminal apparatus.

In the following, the SL CSI-RS is referred to as a CSI-RS for short.

The configuration information of the CSI-RS is used to indicate a configuration of the CSI-RS, for example, a time characteristic of the CSI-RS, resource mapping of the CSI-RS, a power control parameter, and a related parameter for generating the CSI-RS.

Optionally, the time characteristic of the CSI-RS may include: the CSI-RS is a periodic, semi-periodic, or aperiodic.

For a periodic or semi-periodic CSI-RS, the configuration information of the CSI-RS is further used to indicate a configuration period, an offset (offset), and the like of the CSI-RS. For an aperiodic CSI-RS, the configuration information of the CSI-RS is further used to indicate an offset from a moment for starting the channel measurement procedure to a moment for sending the CSI-RS.

In sidelink channel measurement, the CSI-RS is preferably the aperiodic CSI-RS.

The resource mapping of the CSI-RS may include a time domain location, a frequency domain location, a quantity of antenna ports, a code division multiplexing mode, a frequency domain density, a bandwidth, and the like of the CSI-RS on a physical resource.

302: The first terminal apparatus sends channel report configuration information to the second terminal apparatus.

The channel report configuration information may include a candidate time interval set. The candidate time interval set includes one or more candidate time intervals.

For descriptions of the candidate time interval set, refer to step 210. Details are not described herein again.

In addition, the channel report configuration information may further include information such as a channel report time characteristic, a channel report bearer channel and channel resource, and a channel report measurement amount.

Optionally, in sidelink channel report, the channel report bearer channel and channel resource may be a PSSCH. In an implementation, the channel report bearer channel and channel resource may be specified as a PSSCH in a protocol, and is not indicated in the channel report configuration information. This is not limited.

Optionally, step 301 and step 302 may alternatively be combined into one step. That is, the first terminal apparatus sends the configuration information of the CSI-RS and the channel report configuration information to the second terminal apparatus by using a message. This is not limited in this specification.

303: The first terminal apparatus sends first trigger information to the second terminal apparatus, where the first trigger information is used to trigger sidelink channel measurement between the first terminal apparatus and the second terminal apparatus.

304: The first terminal apparatus sends a first CSI-RS to the second terminal apparatus.

Correspondingly, the second terminal apparatus receives and measures the first CSI-RS to obtain a sidelink channel measurement report.

Optionally, in an implementation, there is a time interval (denoted as a time interval X) between step 303 and step 304, that is, an interval between a moment for triggering channel measurement and a moment for sending the first CSI-RS by the first terminal apparatus. In this implementation, the time interval X may be indicated by the configuration information of the CSI-RS in step 301.

Optionally, in another implementation, the time interval X is equal to 0. That is, the first terminal apparatus sends the CSI-RS and the first trigger information to the second terminal apparatus on a same time domain resource. FIG. 3 shows only an example.

In another possible implementation, the configuration information of the CSI-RS does not indicate the time interval X. In addition, the first terminal apparatus does not send the first trigger information to the second terminal apparatus. The second terminal apparatus blindly detects the CSI-RS, and detects that the CSI-RS is used to trigger channel measurement.

305: The second terminal apparatus attempts to obtain an available PSSCH on a time domain resource corresponding to each candidate time interval included in the candidate time interval set. If a PSSCH is successfully obtained on a time domain resource corresponding to a candidate time interval, a channel measurement report is sent to the first terminal apparatus on the time domain resource by using the PSSCH.

It should be understood that the candidate time interval set includes one or more candidate time intervals, and the one or more candidate time intervals correspond to one or more time domain resources. For convenience of description, the following describes a time domain resource on which the second terminal apparatus successfully obtains an available PSSCH is referred to as a first time domain resource.

In addition, the first time domain resource and a second time domain resource for carrying the first trigger information meet a first time interval, and the first time interval is a time interval in the one or more candidate time intervals.

The first time domain resource may be any one of the one or more time domain resources corresponding to the one or more candidate time intervals included in the candidate time interval set.

In addition, to distinguish a PSSCH corresponding to the first time domain resource from another PSSCH that appears below, the following describes the PSSCH corresponding to the first time domain resource as a first PSSCH.

In other words, in step 305, the second terminal apparatus sends the first PSSCH to the first terminal apparatus on the first time domain resource, and the first PSSCH carries the first channel measurement report.

Alternatively, the first channel measurement report is fed back for the first trigger information.

In a possible case, the first PSSCH carries only the first channel measurement report.

In another possible case, the first PSSCH carries data and the first channel measurement report.

After sending the first trigger information, the first terminal apparatus detects a measurement report on a time domain resource corresponding to each candidate time interval included in the candidate time interval set.

Optionally, the first terminal apparatus detects a channel measurement report on a time domain resource corresponding to each candidate time interval included in the candidate time interval set. If the first terminal apparatus does not perform sending on a time domain resource other than the time domain resource corresponding to each candidate time interval included in the candidate time interval set.

The first terminal apparatus may detect a channel measurement report in the following cases.

Case 1

The first terminal apparatus detects no channel measurement report in a first time range.

For descriptions of the first time range, refer to the foregoing descriptions. Details are not described herein again.

In other words, the first terminal apparatus detects no channel measurement report on the time domain resource corresponding to each candidate time interval included in the candidate time interval set.

For example, the second terminal apparatus does not obtain an available PSSCH on the time domain resource corresponding to each candidate time interval included in the candidate time interval set, so that the second terminal apparatus does not feed back the first channel measurement report to the first terminal apparatus, and the case 1 occurs.

When the first terminal apparatus detects no channel measurement report, the first terminal apparatus re-triggers channel measurement, as shown in steps 306 and 307.

306: The first terminal apparatus sends second trigger information to the second terminal apparatus. The second trigger information is used to re-trigger sidelink channel measurement.

307: The first terminal apparatus sends a second CSI-RS to the second terminal apparatus.

Optionally, a time interval X between a time domain resource for carrying the second trigger information and a time domain resource for carrying a second reference signal may be 0, or may not be 0. This is not limited herein.

Correspondingly, the second terminal apparatus receives the second trigger information, receives and measures the second reference signal, to perform re-triggered channel measurement.

Case 2

The first terminal apparatus detects the first PSSCH on the first time domain resource. The first terminal apparatus decodes the data and the first channel measurement report that are carried in the first PSSCH, and provides HARQ feedback for the second terminal apparatus based on a decoding result, as shown in step 308.

308: The first terminal apparatus provides HARQ feedback for the second terminal apparatus on whether the first PSSCH is successfully received.

It should be understood that the first channel measurement report may also be considered as a part of the data carried on the first PSSCH. That is, after receiving the first PSSCH, the first terminal apparatus determines whether all of the data carried on the first PSSCH is correctly received. All of the data includes the first channel measurement report.

For example, if all of the data carried on the first PSSCH is successfully decoded, the first terminal apparatus feeds back an ACK to the second terminal apparatus; or otherwise, the first terminal apparatus feeds back a NACK.

If the second terminal apparatus receives the ACK from the first terminal apparatus, it indicates that both the data and the first channel measurement report that are carried on the first PSSCH are correctly received.

If the second terminal apparatus receives the NACK from the first terminal apparatus, the second terminal apparatus enters a retransmission procedure to retransmit the first PSSCH. Retransmitting the first PSSCH includes retransmitting all of the data carried on the first PSSCH.

309: The second terminal apparatus independently obtains an available second PSSCH, and sends the second PSSCH to the first terminal apparatus.

The second PSSCH carries the data and the first channel measurement report, or the second PSSCH carries only the first channel measurement report. This depends on content carried on the first PSSCH.

As described above, retransmitting the first PSSCH means retransmitting all of the data carried on the first PSSCH. Therefore, if the first PSSCH carries the first channel measurement report, the second PSSCH carries the first channel measurement report.

If the first PSSCH carries the data and the first channel measurement report, the second PSSCH carries the data and the first channel measurement report.

310: The second terminal apparatus sends first retransmission indication information to the first terminal apparatus.

The first retransmission indication information is used to indicate whether the second PSSCH is later than third trigger information. The third trigger information is trigger information that is last sent by the first terminal apparatus to the second terminal apparatus after the first trigger information.

It should be understood that sidelink channel measurement is continuously performed. After sending the first trigger information to the second terminal apparatus, the first terminal apparatus needs to trigger next channel measurement at a time interval. Trigger information used to trigger next channel measurement is the third trigger information herein. That is, the third trigger information is trigger information that is used to trigger next sidelink channel measurement after the first trigger information and that is configured by the first terminal apparatus according to configuration of sidelink channel measurement.

However, the second trigger information in step 306 is sent to the second terminal apparatus after the first terminal apparatus detects no channel measurement report after triggering channel measurement by using the first trigger information. In other words, a condition for sending the second trigger information by the first terminal apparatus is that no channel measurement report is detected.

Optionally, a time domain resource for carrying the second trigger information and a time domain resource for carrying the third trigger information may be the same. This is not limited in this specification.

Optionally, step 309 and step 310 may alternatively be combined into one step. That is, the second terminal apparatus independently obtains an available second PSSCH, sends the second PSSCH to the first terminal apparatus, and sends the first retransmission indication information to the first terminal apparatus on a same time domain resource as the second PSSCH. In other words, the second PSSCH is the same as a time domain resource for carrying the first retransmission indication information.

For example, the second PSSCH and the time domain resource for carrying the first retransmission indication information are located in a same slot.

Optionally, the first retransmission indication information may be used to indicate that the second PSSCH is later than the third trigger information, or the first retransmission indication information is used to indicate that the second PSSCH is not later than the third trigger information.

For example, the first retransmission indication information may be set to one bit, and when the one bit is 1, it indicates that the second PSSCH is later than the third trigger information. When the one bit is 0, it indicates that the second PSSCH is not later than the third trigger information.

That is, the second terminal apparatus may receive the third trigger information before the second terminal apparatus sends the second PSSCH or after the second terminal apparatus sends the second PSSCH. The second terminal apparatus sets the one bit of the first retransmission indication information to 1 or 0 based on whether a moment for sending the second PSSCH is later than a moment for receiving the third trigger information.

Specifically, when the second terminal apparatus sends the second PSSCH, if the third trigger information is not received from the first terminal apparatus after the first trigger information, the first retransmission indication information is specifically used to indicate that the second PSSCH is not later than the third trigger information. Before the second terminal apparatus sends the second PSSCH, if the third trigger information is received from the first terminal apparatus, the first retransmission indication information is specifically used to indicate that the second PSSCH is later than the third trigger information.

The first retransmission indication information is introduced in this application, and needs to be described with reference to step 311.

311: The first terminal apparatus sends the third trigger information to the second terminal apparatus, where the third trigger information is used to trigger channel measurement.

The second terminal apparatus may receive the third trigger information after or before the second terminal apparatus sends the second PSSCH. This specification mainly focuses on the latter case, that is, step 311 is before step 309.

It is assumed that the second terminal apparatus receives the third trigger information before sending the second PSSCH. In this case, if the second terminal apparatus continues to retransmit the first PSSCH, because new channel measurement has been triggered by the third trigger information, retransmission of the first PSSCH causes the first terminal apparatus to receive an expired channel measurement report. If the second terminal apparatus does not retransmit the first PSSCH, because the first PSSCH may carry data other than the first channel measurement report, canceling retransmission of the first PSSCH causes the data other than the first channel measurement report carried on the first PSSCH to be lost. If the second terminal apparatus continues to retransmit the first PSSCH, the first terminal apparatus possibly cannot process the data and the first channel measurement report that are carried on the second PSSCH.

Therefore, for a case in which the second terminal apparatus receives new trigger information before retransmission, this application proposes the following solution.

If the first terminal apparatus does not correctly receive the first PSSCH, and the first PSSCH carries only the first channel measurement report, the second terminal apparatus cancels retransmission of the first PSSCH. That is, the second PSSCH is not sent.

If the first terminal apparatus does not correctly receive the first PSSCH, and the first PSSCH carries the data and the first channel measurement report, the second terminal apparatus continues to retransmit the first PSSCH. Specifically, for example, in step 309, the second terminal apparatus independently obtains the available second PSSCH, and sends the second PSSCH to the first terminal apparatus.

In addition, the second terminal apparatus sends the first retransmission indication information to the first terminal apparatus, to indicate whether the first channel measurement report carried on the second PSSCH expires.

The first terminal apparatus may learn, based on the first retransmission indication information, whether the channel measurement report carried on the second PSSCH expires.

In addition, when retransmitting the second PSSCH, the second terminal apparatus may further send second retransmission indication information to the first terminal apparatus.

312: The second terminal apparatus sends the second retransmission indication information to the first terminal apparatus. The second retransmission indication information is used to indicate that the second PSSCH is a retransmitted PSSCH.

313: The first terminal apparatus obtains, based on the first retransmission indication information, the data carried on the second PSSCH.

Specifically, if the first retransmission indication information is used to indicate that the second PSSCH is later than the third trigger information, it indicates that the first channel measurement report carried on the second PSSCH is an expired channel measurement report, and the first terminal apparatus may directly discard the first channel measurement report.

Alternatively, if the first retransmission indication information is used to indicate that the second PSSCH is later than the third trigger information, and the second PSSCH carries the data and the first channel measurement report, the first terminal apparatus obtains and processes the data carried on the second PSSCH based on the second retransmission indication information, and discards the retransmitted first channel measurement report. That is, the first terminal apparatus does not update a sidelink channel measurement result by using the first channel measurement report.

If the first retransmission indication information is used to indicate that the second PSSCH is not later than the third trigger information, it indicates that the first channel measurement report carried on the second PSSCH is not an expired channel measurement report. The first terminal apparatus may update a sidelink channel measurement result by using the first channel measurement report. Optionally, if the second PSSCH further carries the data, the first terminal apparatus obtains and processes, based on the second retransmission indication information, the data carried on the second PSSCH.

In this application, if the second terminal apparatus retransmits a PSSCH, and the retransmitted PSSCH carries a channel measurement report, the second terminal apparatus additionally sends the first retransmission indication information to the first terminal apparatus, so that the first terminal apparatus can determine, based on the first retransmission indication information, whether the received channel measurement report expires, to further determine whether to update a sidelink channel measurement result based on the channel measurement report, thereby improving performance of a sidelink channel report retransmission mechanism.

In addition, after new channel report is triggered, the second terminal apparatus does not retransmit the PSSCH that includes only the channel measurement report. This avoids unnecessary retransmission, thereby reducing resource overheads for retransmission, and optimizing a sidelink channel report retransmission mechanism.

The following describes various manners of a sidelink channel report method according to this application with reference to FIG. 4 to FIG. 7.

Figure 4:
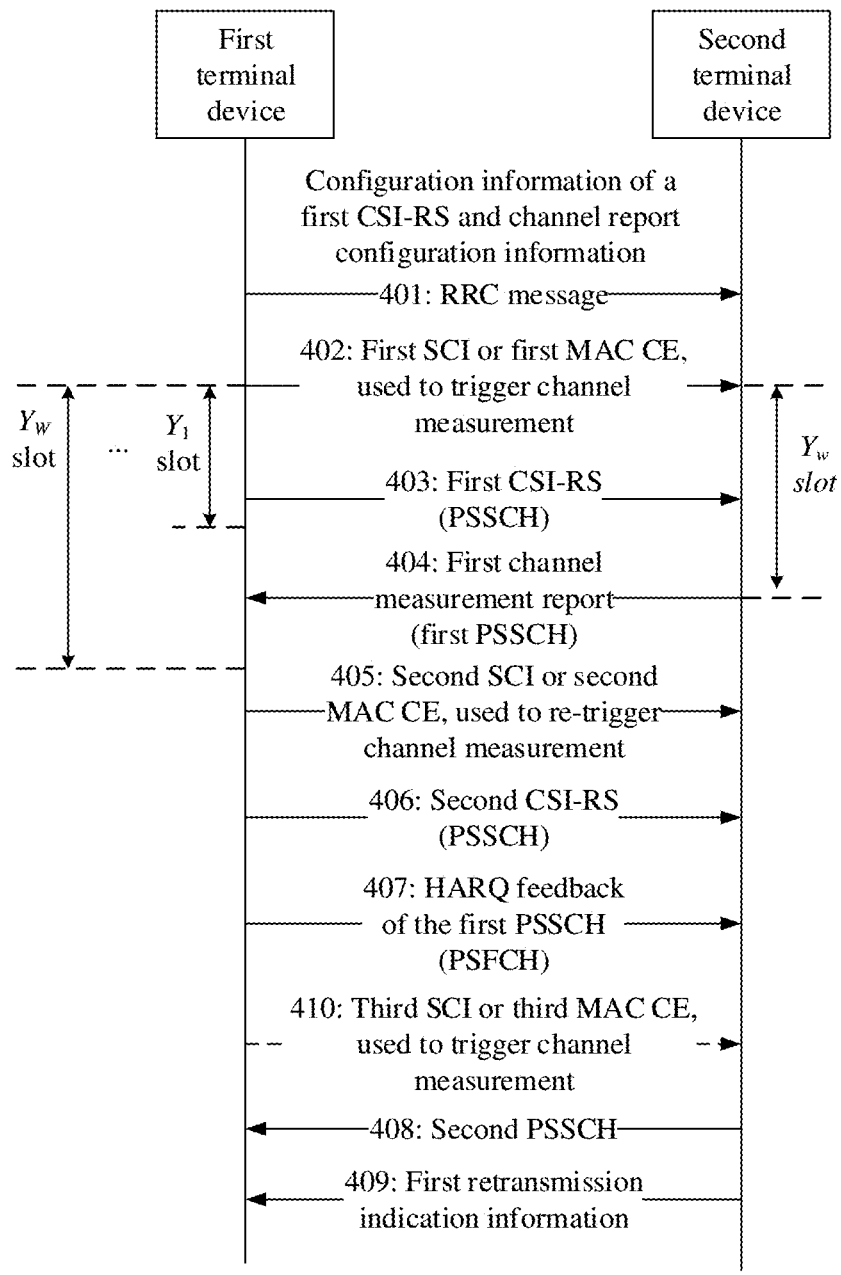
FIG. 4 is an example of a channel measurement method according to this application.

FIG. 4 is an example of a sidelink channel report method according to this application.

401: A first terminal apparatus sends an RRC message to a second terminal apparatus, where the RRC message carries configuration information of a first CSI-RS and channel report configuration information.

The second terminal apparatus receives the RRC message from the first terminal apparatus, and obtains the configuration information of the first CSI-RS and the channel report configuration information.

402: The first terminal apparatus sends first SCI or a first MAC CE to the second terminal apparatus, where the first SCI or the first MAC CE is used to trigger channel measurement.

The first SCI or the first MAC CE carries the indication information, and the indication information is used to indicate one or more candidate time intervals.

It should be understood that, in step 402, if the first terminal apparatus sends the first SCI, the first SCI is carried on a PSCCH. If the first terminal apparatus sends the first MAC CE, the first MAC CE is carried on a PSSCH.

The second terminal apparatus receives the first SCI or the first MAC CE from the first terminal apparatus.

403: The first terminal apparatus sends a first CSI-RS.

Optionally, a time domain resource for carrying first trigger information is the same as a time domain resource for carrying the first CSI-RS. For example, a time domain resource for carrying the first SCI or the first MAC CE is the same as a time domain resource for carrying the first CSI-RS.

The second terminal apparatus receives and measures the first CSI-RS to obtain a first measurement report.

404: The second terminal apparatus obtains, based on the indication information, an available PSSCH on one or more time domain resources corresponding to the one or more candidate time intervals, and sends a first channel measurement report on an obtained first PSSCH.

Optionally, the second terminal apparatus may obtain, based on scheduling of a network device (for example, a BS) or through perception of the second terminal apparatus, an available PSSCH on a time domain resource corresponding to each candidate time interval.

Assuming that the time interval is in a unit of slot, the indication information indicates one or more candidate slot offsets.

Optionally, in a possible case, the second terminal apparatus successfully obtains the first PSSCH in a slot $Y_w$, the second terminal apparatus sends the first PSSCH to the first terminal apparatus in the slot $Y_w$, and the first PSSCH carries the first channel measurement report. Herein, 1≤w≤W.

Optionally, the first channel measurement report may be carried on a MAC CE on the first PSSCH.

Correspondingly, the first terminal apparatus detects a channel measurement report in a first time range. Specifically, the first terminal apparatus detects a channel measurement report from the second terminal apparatus on the one or more time domain resources corresponding to the one or more candidate time intervals. If the first terminal apparatus does not perform sending on a time domain resource other than the one or more time domain resources corresponding to the one or more candidate time intervals, the first terminal apparatus may also detect the channel measurement report from the second terminal apparatus on the time domain resource.

Optionally, in a possible case, the first terminal apparatus detects no channel measurement report from the second terminal apparatus, and the first terminal apparatus re-triggers channel measurement, as shown in steps 405 and 406.

405: The first terminal apparatus sends second SCI or a second MAC CE to the second terminal apparatus.

The second SCI or the second MAC CE is used to re-trigger channel measurement, and is sent when the first terminal apparatus does not detect the first PSSCH.

It should be understood that the second SCI or the second MAC CE is an example of second trigger information.

406: The first terminal apparatus sends a second CSI-RS to the second terminal apparatus.

Optionally, in another case opposite to that in steps 405 and 406, the first terminal apparatus receives the first PSSCH from the second terminal apparatus in the slot $Y_w$. In this case, the first terminal apparatus determines whether all data carried on the first PSSCH is correctly received. The first terminal apparatus provides HARQ feedback to the second terminal apparatus based on a determining result, as shown in step 407.

407: The first terminal apparatus feeds back an ACK or a NACK to the second terminal apparatus on a PSFCH corresponding to the first PSSCH.

If the first terminal apparatus successfully receives the first PSSCH, the first terminal apparatus sends an ACK to the second terminal apparatus. In this case, the first terminal apparatus detects the channel measurement report from the second terminal apparatus.

If the first terminal apparatus fails to receive (that is, fails to decode) the first PSSCH, the first terminal apparatus sends a NACK to the second terminal apparatus.

After receiving the NACK, the second terminal apparatus enters a retransmission procedure, as shown in step 408.

408: The second terminal apparatus independently selects an available second PSSCH, and sends the second PSSCH to the first terminal apparatus.

As described above, if the second PSSCH carries a channel measurement report, the second terminal apparatus sends first retransmission indication information to the first terminal apparatus, as shown in step 409.

409: The second terminal apparatus sends first retransmission indication information to the first terminal apparatus.

The first retransmission indication information is used to indicate whether the channel measurement report carried on the second PSSCH expires.

In a possible case, after the second terminal apparatus enters the retransmission procedure, if the second terminal apparatus has not obtained the available second PSSCH, or the second PSSCH has not been sent, the second terminal apparatus receives third SCI or a third MAC CE from the first terminal apparatus. The third SCI or the third MAC CE is used to trigger new channel measurement, as shown in step 410.

410: The first terminal apparatus sends third SCI or a third MAC CE to the second terminal apparatus, where the third SCI or the third MAC CE is used to trigger channel measurement.

The third SCI or the third MAC CE in step 410 may be an example of the foregoing third trigger information.

In this case, if a PSSCH that needs to be retransmitted by the second terminal apparatus includes only the first channel measurement report, the second terminal apparatus cancels (or cancels) current retransmission, that is, does not retransmit the first PSSCH.

In another case, if a PSSCH that needs to be retransmitted by the second terminal apparatus includes the first channel measurement report and data, the second terminal apparatus sends the second PSSCH to the first terminal apparatus to retransmit the data and the first channel measurement report, and further sends the first retransmission indication information to the first terminal apparatus to indicate that the channel measurement report included in the second PSSCH is an expired channel measurement report.

The first terminal apparatus discards the first channel measurement report based on the first retransmission indication information. That is, the first terminal apparatus does not update an SL channel measurement result by using the first channel measurement report included in the second PSSCH.

The first terminal apparatus indicates the one or more candidate time intervals to the second terminal apparatus, and the second terminal apparatus obtains a PSSCH on a time domain resource corresponding to each candidate time interval for SL channel report. When the first terminal apparatus indicates a plurality of candidate time intervals, a probability that the second terminal apparatus successfully obtains a PSSCH can be increased, thereby facilitating smooth execution of an SL channel measurement procedure.

The procedure shown in FIG. 4 may be used as a complete example of the foregoing manner 1.

Figure 5:
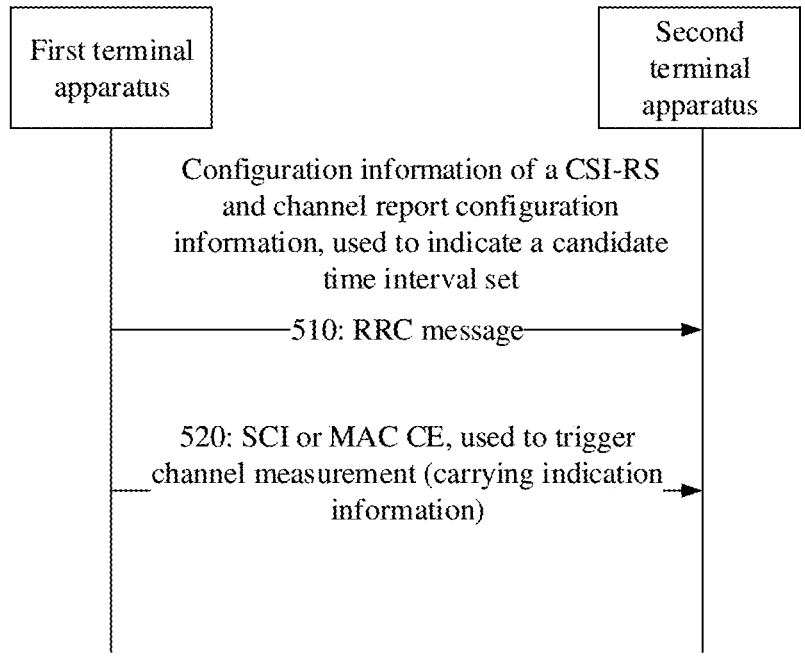
FIG. 5 is another example of a channel measurement method according to this application.

FIG. 5 is another example of a sidelink channel report method according to this application.

510: A first terminal apparatus sends an RRC message to a second terminal apparatus, where the RRC message carries configuration information of a CSI-RS and channel report configuration information.

The channel report configuration information is used to indicate a candidate time interval set. The candidate time interval set includes one or more candidate time intervals.

Correspondingly, the second terminal apparatus receives the RRC message from the first terminal apparatus, and obtains the configuration information of the CSI-RS and the channel report configuration information.

520: The first terminal apparatus sends SCI or a MAC CE to the second terminal apparatus, where the SCI or the MAC CE is used to trigger channel report.

The SCI or the MAC CE carries the indication information. The indication information is used to indicate some candidate time intervals in the candidate time interval set.

530: The first terminal apparatus sends the CSI-RS.

540: The second terminal apparatus obtains, based on the indication information, an available PSSCH on one or more time domain resources corresponding to the one or more candidate time intervals indicated by the indication information, and sends a channel measurement report on the obtained PSSCH.

A subsequent procedure is the same as that in FIG. 4, and details are not described again.

It can be learned that, in the example in FIG. 5, the first terminal apparatus configures the candidate time interval set for the second terminal apparatus, and indicates the one or more candidate time intervals in the candidate time interval set to the second terminal apparatus by using the SCI or the MAC CE, so that the second terminal apparatus can obtain the PSSCH on the one or more time domain resources corresponding to the one or more candidate time intervals indicated by the first terminal apparatus, and use the obtained PSSCH to report an SL channel measurement report.

In the procedure shown in FIG. 5, the first terminal apparatus dynamically indicates the candidate time interval in the candidate time interval set to the second terminal apparatus by using the indication information, so that flexibility of selecting a candidate time interval can be improved, and link adaptability can be improved.

The procedure shown in FIG. 5 may be used as an example of the foregoing manner 2.

Figure 6:
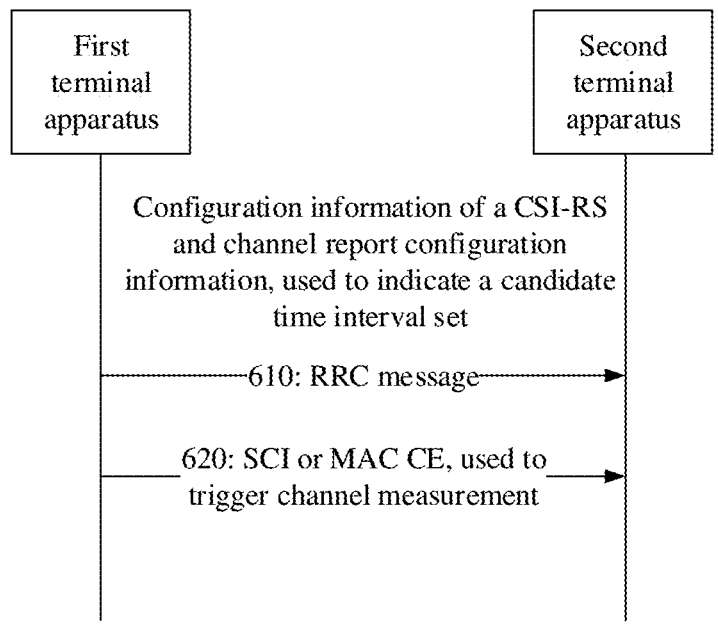
FIG. 6 is another example of a channel measurement method according to this application.

FIG. 6 is another example of a sidelink channel report method according to this application.

610: A first terminal apparatus sends an RRC message to a second terminal apparatus, where the RRC message carries configuration information of a CSI-RS and channel report configuration information.

The channel report configuration information is used to indicate a candidate time interval set.

620: The first terminal apparatus sends SCI or a MAC CE to the second terminal apparatus, where the SCI or the MAC CE is used to trigger channel report.

The SCI or the MAC CE used to trigger channel report does not carry the indication information.

It may be learned from step 610 and step 620 that, in this embodiment, the first terminal apparatus configures only the candidate time interval set for the second terminal apparatus.

After obtaining a channel measurement report by measuring the CSI-RS, the second terminal apparatus attempts to obtain an available PSSCH at each candidate time interval in the candidate time interval set indicated by the channel report configuration information, thereby improving a probability of successfully obtaining the PSSCH.

It should be understood that the procedure shown in FIG. 6 may be used as an example of the foregoing manner 3.

Figure 7:
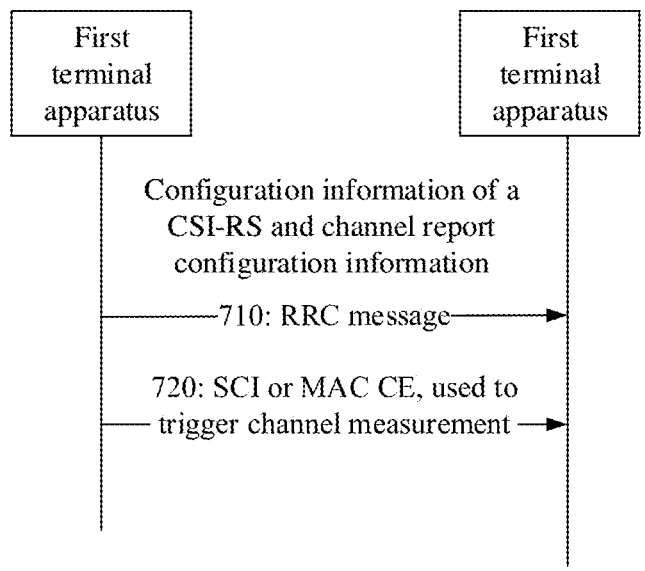
FIG. 7 is another example of a channel measurement method according to this application.

FIG. 7 is another example of a sidelink channel measurement method according to this application.

710: A first terminal apparatus sends an RRC message to a second terminal apparatus, where the RRC message carries configuration information of a CSI-RS and channel report configuration information.

In step 710, the channel report configuration information does not indicate a candidate time interval set.

720: The first terminal apparatus sends SCI or a MAC CE to the second terminal apparatus, where the SCI or the MAC CE is used to trigger channel report.

The SCI or the MAC CE used to trigger channel report does not carry the indication information.

In the embodiment of FIG. 7, the first terminal apparatus neither configures the candidate time interval set for the second terminal apparatus, nor indicates one or more candidate time intervals to the second terminal apparatus. The second terminal apparatus independently selects an available PSSCH for SL channel report, so that signaling overheads caused when the first terminal apparatus indicates the candidate time interval set or the candidate time interval to the second terminal apparatus can be reduced.

The procedure shown in FIG. 7 may be an example of the manner 4.

It should be understood that FIG. 5 to FIG. 7 mainly show related steps in which the first terminal apparatus configures the candidate time interval set or the candidate time interval for the second terminal apparatus. To avoid repetition, for steps in which the first terminal apparatus sends a CSI-RS, trigger information, and HARQ feedback, a new channel measurement procedure that is triggered because a channel measurement report is not detected, a step in which the second terminal apparatus sends a channel measurement report, and a possible retransmission procedure that is not shown, refer to the procedure shown in FIG. 3 or FIG. 4. Details are not described again.

In the foregoing embodiments, a transmit end (that is, the first terminal apparatus) of SL communication may configure a candidate time interval set or a candidate time interval based on a channel busy ratio (channel busy ratio, CBR), data sending load of the first terminal apparatus, data sending load of the second terminal apparatus, a service priority, a service reliability requirement, and the like.

The data sending load of the first terminal apparatus is data sending load of transmit end UE on an SL, and the data sending load of the second terminal apparatus is data sending load of receive end UE on an SL.

Figure 8:
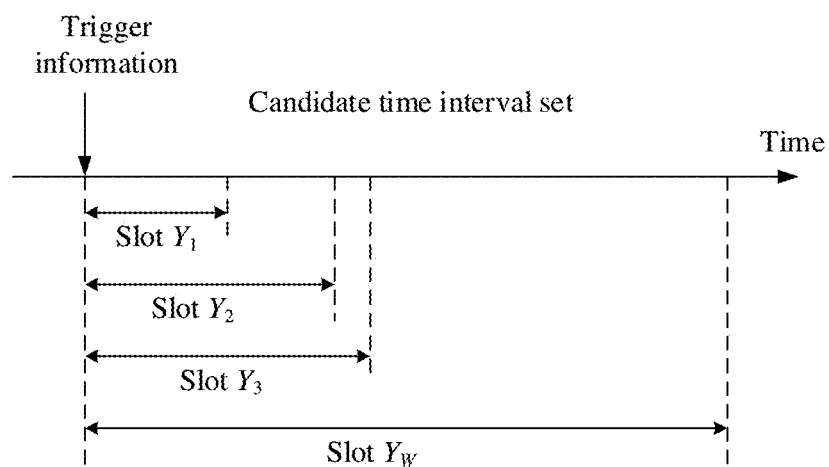
FIG. 8 is a schematic diagram of a candidate time interval for sidelink channel report.

FIG. 8 is a schematic diagram of a candidate time interval for sidelink channel report. As shown in FIG. 8, a candidate time interval set $\{Y_1, Y_2, \ldots, Y_W\}$ includes W candidate slots. Herein, W is a positive integer, and a value of W may be configured. A time interval between a moment corresponding to trigger information and a start moment of a slot $Y_W$ is an example of a first time range.

For example, a CBR of the receive end UE affects a value of W. When the CBR is relatively high, a probability that the receive end UE obtains an available PSSCH decreases. Therefore, W needs to be increased, to increase a probability that the receive end UE successfully obtains a PSSCH and sends an SL channel report. On the contrary, W needs to be appropriately reduced, to reduce a quantity of slots in which the transmit end UE is limited to a receive state, and increase resource utilization.

In a feasible manner, a value range of the CBR is divided into $K_{CBR}$ intervals in ascending order, and a maximum window is defined for a $k \in \{1, 2, \ldots, K_{CBR}\}^{th}$ interval. Herein, $W_{CBR,k}^{max}$ increases as k increases. For a given value of the CBR, a CBR interval to which the CBR belongs is first determined and an interval number k is obtained, and then $W_{CBR,k}^{max}$ corresponding to the interval number is defined as $W_{CBR}^{max}$, where $W \le W_{CBR}^{max}$.

For another example, data sending load of the transmit end UE affects a value of W. When the sending load of the transmit end UE is relatively high, W needs to be reduced, to increase resource utilization. On the contrary, W may be appropriately increased, to increase a probability that the receive end UE successfully obtains a PSSCH and sends an SL channel report.

In a feasible manner, the sending load of the transmit end UE is divided into $K_{TxLoad}$ intervals in ascending order, and a maximum window is defined for a $k \in \{1, 2, \ldots, K_{TxLoad}\}^{th}$ interval. Herein, $W_{TxLoad,k}^{max}$ decreases as k increases. For given sending load of the transmit end UE, a sending load interval to which the sending load belongs is first determined and an interval number k is obtained, and then $W_{TxLoad,k}^{max}$ corresponding to the interval number is defined as $W_{TxLoad}^{max}$, where $W \leq W_{TxLoad}^{max}$.

For another example, data sending load of the receive end UE affects a value of W. When the sending load of the receive end UE is relatively low, the receive end UE may wait for data to arrive, and then send an SL channel report to the transmit end UE together with the data, to reduce a quantity of PSSCHs that include only an SL channel measurement report. Therefore, W needs to be increased, so that the receive end UE has enough selection space, thereby increasing resource utilization of the receive end UE. On the contrary, W may be appropriately reduced, to reduce a quantity of slots in which the transmit end UE is limited to a receive state, and increase resource utilization of the transmit end UE.

In a feasible manner, the sending load of the receive end UE is divided into $K_{RxLoad}$ intervals in ascending order, and a maximum window $W_{RxLoad,k}^{max}$ is defined for a $k \in \{1, 2, \ldots, K_{RxLoad}\}^{th}$ interval. Herein, $W_{RxLoad}^{max}$ decreases as k increases. For given sending load of the receive end UE, a sending load interval to which the sending load belongs is first determined and an interval number k is obtained, and then $W_{RxLoad,k}^{max}$ corresponding to the interval number k is defined as $W_{RxLoad}^{max}$, where $W \leq W_{RxLoad}^{max}$.

For another example, a service priority of the transmit end UE affects configuration of each slot offset. When the transmit end UE knows that a high-priority service exists in some slots in the future, in order not to affect sending of the high-priority service, a slot offset selected by the transmit end UE needs to be avoided from these slots.

For another example, a service reliability requirement of the transmit end UE affects configuration of each offset. If a service reliability requirement of the transmit end UE is relatively high, the receive end UE needs to feed back a channel measurement result to the transmit end UE as soon as possible. Therefore, when configuring each SL channel report slot offset, the transmit end UE needs to appropriately reduce values of $Y_1, Y_2, \ldots,$ and $Y_W$, so that SL channel report is fed back as soon as possible.

The first terminal apparatus may appropriately configure, based on the foregoing factors, a quantity of candidate time intervals included in a candidate time interval set for sidelink channel report, duration of the candidate time interval, and the like.

The sidelink channel measurement method provided in this application is described above in detail. The following describes a terminal apparatus provided in this application.

Figure 9:
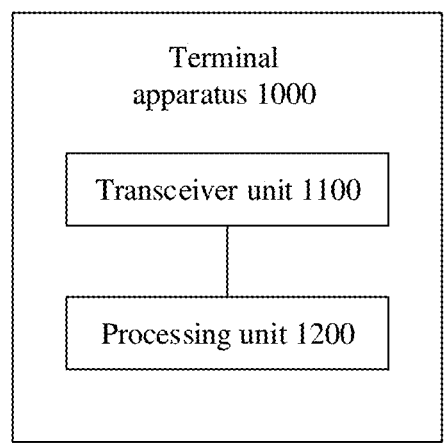
FIG. 9 is a schematic block diagram of a terminal apparatus 1000 according to this application.

FIG. 9 is a schematic block diagram of a terminal apparatus 1000 according to this application. As shown in FIG. 9, the terminal apparatus 1000 includes a transceiver unit 1100 and a processing unit 1200.

The transceiver unit 1100 is configured to send indication information to a second terminal apparatus, where the indication information is used to indicate one or more candidate time intervals, the candidate time interval is a time interval between a time domain resource for carrying trigger information and a time domain resource for carrying a channel measurement report, and the trigger information is used to trigger channel measurement.

The transceiver unit 1100 is further configured to send first trigger information and a first reference signal to the second terminal apparatus, where the first reference signal is used for channel measurement.

The processing unit 1200 is configured to control the transceiver unit 1100 to detect a channel measurement report from the second terminal apparatus based on the one or more candidate time intervals.

Optionally, the transceiver unit 1100 may alternatively be replaced with a sending unit or a receiving unit. For example, when performing a sending action, the transceiver unit 1100 may be replaced with a sending unit. When performing a receiving action, the transceiver unit 1100 may be replaced with a receiving unit.

Optionally, in an embodiment, the transceiver unit 1100 is further configured to receive a first channel measurement report from the second terminal apparatus in a first time range. The first time range is a time range whose duration is a first candidate time interval starting from a moment for sending the first trigger information, and the first candidate time interval is a maximum candidate time interval in the one or more candidate time intervals.

Optionally, in another embodiment, the transceiver unit 1100 is further configured to: if no channel measurement report from the second terminal apparatus is detected in a first time range, send second trigger information and a second reference signal to the second terminal apparatus. The first time range is a time range whose duration is a first candidate time interval starting from a moment for sending the first trigger information, and the first candidate time interval is a maximum candidate time interval in the one or more candidate time intervals.

Optionally, in another embodiment, the transceiver unit 1100 is further configured to send channel report configuration information to the second terminal apparatus, where the configuration information is used to indicate a candidate time interval set, and the one or more candidate time intervals belong to the candidate time interval set.

Optionally, in another embodiment, the transceiver unit 1100 is further configured to: send a negative acknowledgement to the second terminal apparatus, where the negative acknowledgement is used to indicate that the terminal apparatus fails to decode a first physical sidelink shared channel PSSCH, and the first PSSCH carries data and the first channel measurement report; receive a second PSSCH from the second terminal apparatus, where the second PSSCH carries the data and the first channel measurement report; and send first retransmission indication information to the second terminal apparatus, where the first retransmission indication information is used to indicate whether the second PSSCH is later than third trigger information, and the third trigger information is trigger information that is last sent by the terminal apparatus 1000 to the second terminal apparatus after the first trigger information.

Optionally, in another embodiment, the first retransmission indication information is used to indicate that the second PSSCH is later than the third trigger information, and the processing unit 1200 is configured to discard the first channel measurement report based on the first retransmission indication information.

Optionally, in another embodiment, the processing unit 1200 is further configured to control the transceiver unit 1100 to detect a channel measurement report on one or more time domain resources corresponding to the one or more candidate time intervals.

In an implementation, the terminal apparatus 1000 may be a transmit end device in sidelink communication, for example, a combination device or a component that can implement the foregoing method functions in a terminal device or a first terminal apparatus in the terminal device. In this implementation, the receiving unit 1100 may be a transceiver. The transceiver may include a receiver and a transmitter. The processing unit 1200 may be a processing apparatus.

In another implementation, the terminal apparatus 1000 may be a chip or an integrated circuit installed in the transmit end device. In this implementation, the transceiver unit 1100 may be a communication interface. For example, the transceiver unit 1100 may be an input/output interface or an input/output circuit. The input/output interface may include an input interface and an output interface. The input/output circuit may include an input circuit and an output circuit. The processing unit 1200 may be a processing apparatus.

A function of the processing apparatus may be implemented by hardware, or may be implemented by hardware by executing corresponding software. For example, the processing apparatus may include a memory and a processor. The memory is configured to store a computer program, and the processor reads and executes the computer program stored in the memory, so that the communication apparatus 1000 performs an operation and/or processing performed by the first terminal apparatus in the method embodiments.

Optionally, the processing apparatus may include only the processor, and the memory configured to store the computer program is located outside the processing apparatus. The processor is connected to the memory through a circuit/cable, to read and execute the computer program stored in the memory.

Optionally, the transceiver unit 1100 may be a radio frequency apparatus, and the processing unit 1200 may be a baseband apparatus.

Figure 10:
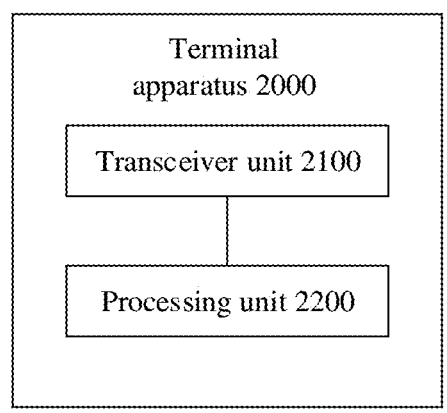
FIG. 10 is a schematic block diagram of a terminal apparatus 2000 according to this application.

FIG. 10 is a schematic block diagram of a terminal apparatus 2000 according to this application. As shown in FIG. 10, the terminal apparatus 2000 includes a transceiver unit 2100 and a processing unit 2200.

The transceiver unit 2100 is configured to receive indication information from a first terminal apparatus, where the indication information is used to indicate one or more candidate time intervals, the candidate time interval is a time interval between a time domain resource for carrying trigger information and a time domain resource for carrying a channel measurement report, and the trigger information is used to trigger channel measurement.

The transceiver unit 2100 is further configured to receive first trigger information and a first reference signal from the first terminal apparatus, where the first reference signal is used for channel measurement.

The processing unit 2200 is configured to determine a first time domain resource based on the indication information, where the first time domain resource is used to send a first channel measurement report to the first terminal apparatus.

Optionally, the transceiver unit 2100 may alternatively be replaced with a sending unit or a receiving unit. For example, when performing a sending action, the transceiver unit 2100 may be replaced with a sending unit. When performing a receiving action, the transceiver unit 2100 may be replaced with a receiving unit.

Optionally, in an embodiment, the first time domain resource and a second time domain resource for carrying the first trigger information meet a first time interval, and the first time interval is a time interval in one or more candidate time intervals.

Optionally, in another embodiment, the transceiver unit 2100 is further configured to receive configuration information from the first terminal apparatus, where the configuration information is used to indicate a candidate time interval set, and the one or more candidate time intervals belong to the candidate time interval set.

Optionally, in another embodiment, the transceiver unit 2100 is further configured to: receive a negative acknowledgement from the first terminal apparatus, where the negative acknowledgement is used to indicate that the first terminal apparatus fails to decode a first PSSCH, and the first PSSCH carries data and the first channel measurement report; send a second PSSCH to the first terminal apparatus, where the second PSSCH carries the data and the first channel measurement report; and send first retransmission indication information to the first terminal apparatus, where the first retransmission indication information is used to indicate whether the second PSSCH is later than third trigger information, and the third trigger information is trigger information that is last sent by the first terminal apparatus to the terminal apparatus after the first trigger information.

Optionally, in another embodiment, the transceiver unit 2100 is further configured to: receive a negative acknowledgement from the first terminal apparatus, where the negative acknowledgement is used to indicate that the first terminal apparatus fails to decode a first PSSCH, and the first PSSCH carries the first channel measurement report; and receive third trigger information from the first terminal apparatus, where the third trigger information is trigger information that is last sent by the first terminal apparatus to the second terminal apparatus after the first trigger information.

The processing unit 2200 is configured to control the transceiver unit 2100 not to retransmit the first PSSCH.

In an implementation, the terminal apparatus 2000 may be a receive end device in sidelink communication, for example, a combination device or a component that can implement the foregoing method functions in a terminal device or a second terminal apparatus in the terminal device. In this implementation, the receiving unit 2100 may be a transceiver. The transceiver may include a receiver and a transmitter. The processing unit 2200 may be a processing apparatus.

In another implementation, the terminal apparatus 2000 may be a chip or an integrated circuit installed in the receive end device. In this implementation, the transceiver unit 2100 may be a communication interface. For example, the transceiver unit 2100 may be an input/output interface or an input/output circuit. The input/output interface may include an input interface and an output interface. The input/output circuit may include an input circuit and an output circuit. The processing unit 2200 may be a processing apparatus.

A function of the processing apparatus may be implemented by hardware, or may be implemented by hardware by executing corresponding software. For example, the processing apparatus may include a memory and a processor. The memory is configured to store a computer program, and the processor reads and executes the computer program stored in the memory, so that the communication apparatus 2000 performs an operation and/or processing performed by the second terminal apparatus in the method embodiments.

Optionally, the processing apparatus may include only the processor, and the memory configured to store the computer program is located outside the processing apparatus. The processor is connected to the memory through a circuit/cable, to read and execute the computer program stored in the memory.

Optionally, the transceiver unit 2100 may be a radio frequency apparatus, and the processing unit 2200 may be a baseband apparatus.

Figure 11:
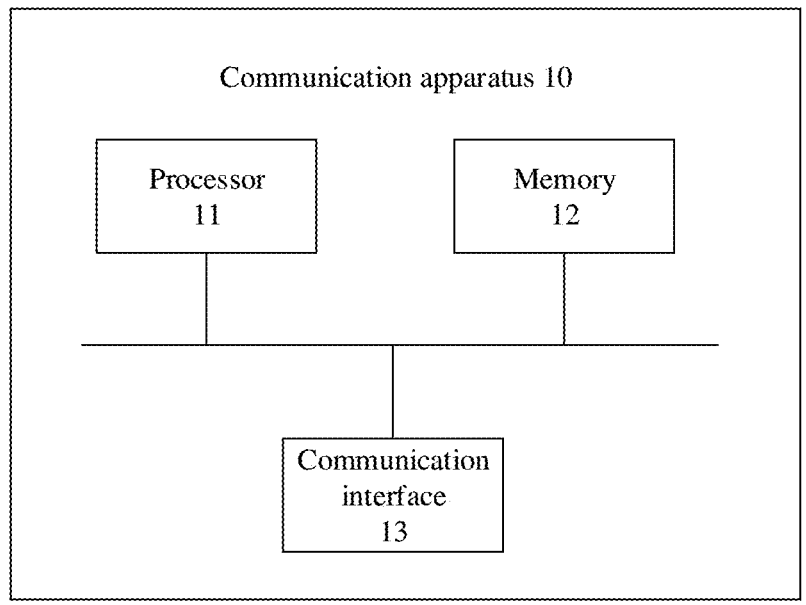
FIG. 11 is a schematic diagram of a structure of a terminal apparatus 10 according to this application.

FIG. 11 is a schematic diagram of a structure of a terminal apparatus 10 according to this application. As shown in FIG. 11, the terminal apparatus 10 includes one or more processors 11, one or more memories 12, and one or more communication interfaces 13. The processor 11 is configured to control the communication interface 13 to receive and send a signal, the memory 12 is configured to store a computer program, and the processor 11 is configured to invoke and run the computer program in the memory 12, to execute a procedure and/or an operation performed by the first terminal apparatus in each embodiment of the sidelink channel measurement method provided in this application.

For example, the processor 11 may have a function of the processing unit 1200 shown in FIG. 9, and the communication interface 13 may have a function of the transceiver unit 1100 shown in FIG. 9. For details, refer to the descriptions in FIG. 9. Details are not described herein again.

Optionally, when the terminal apparatus 10 is a transmit end device of a sidelink, the processor 11 may be a baseband apparatus installed in the transmit end device, and the communication interface 13 may be a radio frequency apparatus.

Figure 12:
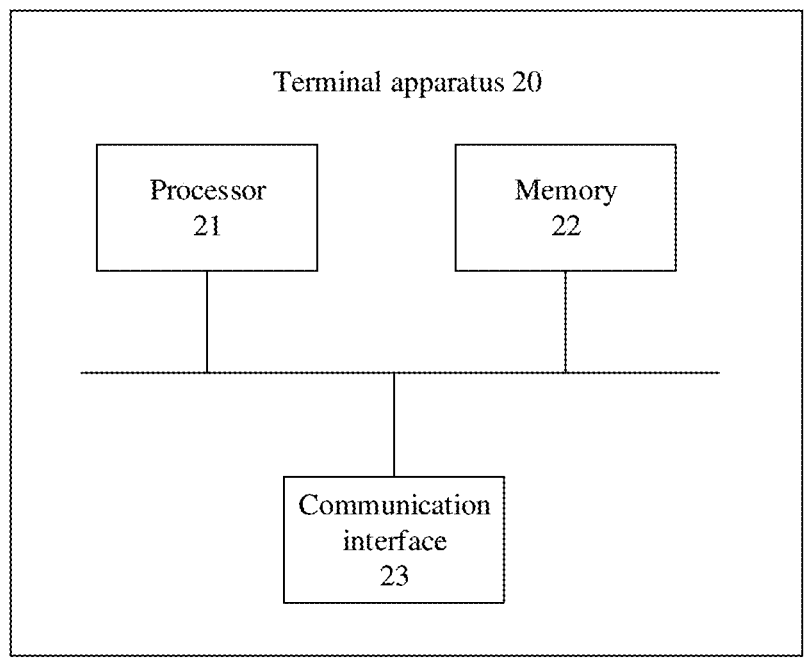
FIG. 12 is a schematic diagram of a structure of a terminal apparatus 20 according to this application.

FIG. 12 is a schematic diagram of a structure of a terminal apparatus 20 according to this application. As shown in FIG. 12, the terminal apparatus 20 includes one or more processors 21, one or more memories 22, and one or more communication interfaces 23. The processor 21 is configured to control the communication interface 23 to receive and send a signal, the memory 22 is configured to store a computer program, and the processor 21 is configured to invoke and run the computer program in the memory 22, to execute a procedure and/or an operation performed by the second terminal apparatus in each embodiment of the sidelink channel measurement method provided in this application.

For example, the processor 21 may have a function of the processing unit 2200 shown in FIG. 10, and the communication interface 23 may have a function of the transceiver unit 2100 shown in FIG. 10. For details, refer to the descriptions in FIG. 10. Details are not described herein again.

Optionally, the memory and the processor in the foregoing apparatus embodiments may be physically independent units, or the memory and the processor may be integrated together.

In addition, this application further provides a computer-readable storage medium. The computer-readable storage medium stores computer instructions. When the computer instructions are on a computer, the computer is enabled to perform an operation and/or a procedure performed by the first terminal apparatus in the channel measurement method provided in this application.

This application further provides a computer-readable storage medium. The computer-readable storage medium stores computer instructions. When the computer instructions are on a computer, the computer is enabled to perform an operation and/or a procedure performed by the second terminal apparatus in the channel measurement method provided in this application.

This application further provides a computer program product. The computer program product includes computer program code. When the computer program code is run on a computer, the computer is enabled to perform an operation and/or a procedure performed by the first terminal apparatus in the channel measurement method provided in this application.

This application further provides a computer program product. The computer program product includes computer program code. When the computer program code is run on a computer, the computer is enabled to perform an operation and/or a procedure performed by the second terminal apparatus in the channel measurement method provided in this application.

This application further provides a chip, and the chip includes a processor. A memory configured to store a computer program is disposed independent of the chip. The processor is configured to execute the computer program stored in the memory, to perform an operation and/or processing performed by the first terminal apparatus in any method embodiment.

Further, the chip may further include a communication interface. The communication interface may be an input/output interface, an input/output circuit, or the like. Further, the chip may further include the memory.

This application further provides a chip, and the chip includes a processor. A memory configured to store a computer program is disposed independent of the chip. The processor is configured to execute the computer program stored in the memory, to perform an operation and/or processing performed by the second terminal apparatus in any method embodiment.

Further, the chip may further include a communication interface. The communication interface may be an input/output interface, an input/output circuit, or the like. Further, the chip may further include the memory.

In addition, this application further provides a wireless communication system, including the first terminal apparatus and the second terminal apparatus in the embodiments of this application.

The processor in the embodiments of this application may be an integrated circuit chip, and has a signal processing capability. In an implementation process, the steps in the foregoing method embodiments may be completed by using a hardware integrated logic circuit in a processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor, or the like. The steps of the methods disclosed in the embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with the hardware of the processor.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that, the memory in the system and method described in this specification includes but is not limited to these memories and any memory of another proper type.

The terms such as "unit", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using the figures, both a computing device and an application that runs on the computing device may be components. One or more components may reside within the process and/or the execution thread. The components may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or a network such as the Internet interacting with another system by using the signal).

A person of ordinary skill in the art may be aware that, in combination with the examples described in the embodiments disclosed in this specification, units and algorithm steps can be implemented by electronic hardware or a combination of computer software and electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    sending, by a first terminal apparatus, reference signal configuration information to a second terminal apparatus, the reference signal configuration information indicating a resource of a first reference signal, the first reference signal being used for channel measurement;
    sending, by the first terminal apparatus, channel report configuration information to the second terminal apparatus, the channel report configuration information comprising a candidate time interval, the candidate time interval being a time interval between a time domain resource for carrying trigger information and a time domain resource for carrying a channel measurement report, the trigger information triggering channel measurement;
    sending, by the first terminal apparatus, first trigger information to the second terminal apparatus;
    sending, by the first terminal apparatus, the first reference signal to the second terminal apparatus; and
    detecting, by the first terminal apparatus, a channel measurement report from the second terminal apparatus based on the candidate time interval, wherein detecting the channel measurement report comprises:
        receiving, by the first terminal apparatus, a first channel measurement report from the second terminal apparatus in a first time range,
        wherein the first time range has a duration that is a first candidate time interval starting from a moment for sending the first trigger information by the first terminal apparatus.

2. The method according to claim 1, wherein the candidate time interval is in a unit of slot.

3. The method according to claim 1, wherein:
the first reference signal is a sidelink channel state information reference signal (SL CSI-RS); and
the SL CSI-RS is aperiodic.

4. The method according to claim 1, wherein the reference signal configuration information and the channel report configuration information are carried in a radio resource control (RRC) message.

5. The method according to claim 1, wherein a time domain resource for carrying the first trigger information, as sent by the first terminal apparatus, is the same as a time domain resource for carrying the first reference signal, as sent by the first terminal apparatus.

6. A method, comprising:
receiving, by a second terminal apparatus, reference signal configuration information from a first terminal apparatus, the reference signal configuration information indicating a resource of a first reference signal, the first reference signal being used for channel measurement;
receiving, by the second terminal apparatus, channel report configuration information from the first terminal apparatus, the channel report configuration information comprising a candidate time interval, the candidate time interval being a time interval between a time domain resource for carrying trigger information and a time domain resource for carrying a channel measurement report, the trigger information triggering channel measurement;
receiving, by the second terminal apparatus, first trigger information from the first terminal apparatus;
receiving, by the second terminal apparatus, the first reference signal from the first terminal apparatus;
obtaining, by the second terminal apparatus, a first channel measurement report based on the first reference signal;
determining, by the second terminal apparatus, a first time domain resource based on the channel report configuration information; and
sending, by the second terminal apparatus using the first time domain resource, the first channel measurement report to the first terminal apparatus, wherein sending the first channel measurement report comprises:
sending, by the second terminal apparatus, the first channel measurement report to the first terminal apparatus in a first time range,
wherein the first time range has a duration that is a first candidate time interval starting from a moment for sending the first trigger information by the first terminal apparatus.

7. The method according to claim 6, wherein the candidate time interval is in a unit of slot.

8. The method according to claim 6, wherein:
the first reference signal is a sidelink channel state information reference signal (SL CSI-RS); and
the SL CSI-RS is aperiodic.

9. The method according to claim 6, wherein the reference signal configuration information and the channel report configuration information, as received by the second terminal apparatus, are carried in a radio resource control (RRC) message.

10. The method according to claim 6, wherein a time domain resource carrying the first trigger information, as received by the second terminal apparatus, is the same as a time domain resource carrying the first reference signal, as received by the second terminal apparatus.

11. An apparatus, comprising:
one or more processors; and
a non-transitory memory configured to store program instructions that are executable by the one or more processors, wherein the program instructions include instructions that, when executed by the one or more processors, cause the apparatus to:
send reference signal configuration information to a second terminal apparatus, the reference signal configuration information indicating a resource of a first reference signal, the first reference signal being used for channel measurement;
send channel report configuration information to the second terminal apparatus, the channel report configuration information indicating a candidate time interval, the candidate time interval being a time interval between a time domain resource for carrying trigger information and a time domain resource for carrying a channel measurement report, the trigger information triggering channel measurement;
send first trigger information to the second terminal apparatus;
send the first reference signal to the second terminal apparatus; and
detect a channel measurement report from the second terminal apparatus based on the candidate time interval, wherein to detect the channel measurement report, the instructions, when executed by the one or more processors, cause the apparatus to:
receive a first channel measurement report from the second terminal apparatus in a first time range,
wherein the first time range has a duration that is a first candidate time interval starting from a moment for sending the first trigger information.

12. The apparatus according to claim 11, wherein the candidate time interval is in a unit of slot.

13. The apparatus according to claim 11, wherein:
the first reference signal is a sidelink channel state information reference signal (SL CSI-RS); and
the SL CSI-RS is aperiodic.

14. The apparatus according to claim 11, wherein the reference signal configuration information and the channel report configuration information, as sent, are carried in a radio resource control (RRC) message.

15. The apparatus according to claim 11, wherein a time domain resource for carrying the first trigger information, as sent, is the same as a time domain resource for carrying the first reference signal, as sent.

16. An apparatus, comprising:
one or more processors, and
a non-transitory memory configured to store program instructions that are executable by the one or more processors, wherein the program instructions include instructions that, when executed by the one or more processors, cause the apparatus to:
receive reference signal configuration information from a first terminal apparatus, the reference signal configuration information indicating a resource of a first reference signal, the first reference signal being used for channel measurement;
receive channel report configuration information from the first terminal apparatus, the channel report configuration information indicating a candidate time interval, the candidate time interval being a time interval between a time domain resource for carrying trigger information and a time domain resource for carrying a channel measurement report, the trigger information triggering channel measurement;

receive first trigger information from the first terminal apparatus;

receive the first reference signal from the first terminal apparatus;

obtain a first channel measurement report based on the first reference signal;

determine a first time domain resource based on the channel report configuration information; and send, using the first time domain resource, the first channel measurement report to the first terminal apparatus, wherein to send the first channel measurement report, the instructions, when executed by the one or more processors, cause the apparatus to:

send the first channel measurement report to the first terminal apparatus in a first time range, wherein the first time range has a duration that is a first candidate time interval starting from a moment for sending the first trigger information by the first terminal apparatus.

17. The apparatus according to claim 16, wherein the candidate time interval is in a unit of slot.

18. The apparatus according to claim 16, wherein:
the first reference signal is a sidelink channel state information reference signal (SL CSI-RS); and
the SL CSI-RS is aperiodic.

19. The apparatus according to claim 16, wherein the reference signal configuration information and the channel report configuration information, as received, are carried in a radio resource control (RRC) message.

20. The apparatus according to claim 16, wherein a time domain resource carrying the first trigger information, as received, is the same as a time domain resource carrying the first reference signal, as received.

* * * * *